US010023706B2

(12) United States Patent
Bellehumeur et al.

(10) Patent No.: US 10,023,706 B2
(45) Date of Patent: *Jul. 17, 2018

(54) ROTOMOLDED ARTICLES

(71) Applicant: NOVA Chemicals (International) S.A., Fribourg (CH)

(72) Inventors: Celine Bellehumeur, Calgary (CA); Brian Molloy, Airdrie (CA); Hamidreza Khakdaman, Houston, TX (US); XiaoChuan Wang, Calgary (CA); Tieqi Li, Calgary (CA); Christopher Dobbin, Calgary (CA); Fazle Sibtain, Calgary (CA); Kenneth Taylor, Sarnia (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/609,051

(22) Filed: May 31, 2017

(65) Prior Publication Data

US 2017/0267822 A1 Sep. 21, 2017

Related U.S. Application Data

(63) Continuation-in-part of application No. 15/335,485, filed on Oct. 27, 2016, which is a continuation of (Continued)

(30) Foreign Application Priority Data

Oct. 21, 2014 (CA) ...................................... 2868640

(51) Int. Cl.
*C08J 5/18* (2006.01)
*C08L 23/20* (2006.01)
(Continued)

(52) U.S. Cl.
CPC ................ *C08J 5/18* (2013.01); *B29C 41/04* (2013.01); *B29C 41/22* (2013.01); *B32B 3/266* (2013.01);
(Continued)

(58) Field of Classification Search
CPC ...... C08F 2/001; C08F 4/6555; C08F 210/16; C08F 4/65904; C08F 4/6585; C08F 4/6583; C08F 4/6592; C08F 2/06; C08F 2500/17; C08F 2500/03; C08F 2500/13; C08F 2500/09; C08F 210/14; C08F 2500/11; C08F 4/65908; C08F 4/65912; C08F 2420/04; C08F 2500/12; C08F 2500/18; C08F 2420/01; C08F 2500/26; B32B 3/266; B32B 27/327; B32B 7/12; B32B 27/08; B32B 27/34; B32B 2307/7265; B32B 2439/40; C08J 5/18; C08J 5/00; C08J 2323/06; C08J 2323/24; C08J 2423/24; C08J 2323/20; C08J 2323/08; C08J 2423/08; C08L 23/0815; C08L 23/20; C08L 2203/16; C08L 2205/03; C08L 2314/02; C08L 2314/06; C08L 2205/025; B29C 41/04; B29K 2995/0088; B29K 2023/08; B29K 2105/0085; B29K 2105/0094; B29K 2905/02; B29K 2995/0063; B29K 2105/0058
See application file for complete search history.

(56) References Cited

U.S. PATENT DOCUMENTS

| | | |
|---|---|---|
| 5,382,630 A | 1/1995 | Stehling et al. |
| 5,382,631 A | 1/1995 | Stehling et al. |
| 5,408,004 A | 4/1995 | Lai et al. |
| 5,519,091 A | 5/1996 | Tsutsui et al. |
| 5,530,065 A | 6/1996 | Farley et al. |
| 5,605,969 A | 2/1997 | Tsutsui et al. |
| 5,674,342 A | 10/1997 | Obijeski et al. |
| 5,677,383 A | 10/1997 | Chum et al. |
| 5,685,128 A | 11/1997 | Chum et al. |
| 5,747,594 A | 5/1998 | deGroot et al. |
| 5,773,106 A | 6/1998 | deGroot et al. |
| 5,783,638 A | 7/1998 | Lai et al. |

(Continued)

FOREIGN PATENT DOCUMENTS

| | | |
|---|---|---|
| EP | 0 770 629 A2 | 5/1997 |
| EP | 0 733 653 B1 | 11/1998 |

(Continued)

OTHER PUBLICATIONS

Wild, L.; Ryle, T. R.; Knobelock, D. C and Peat, I. R.; Determination of Branching Distributions in Polyethylene and Ethylene Corpolymers; Journal of Polymer Science: Polymer Physics Edition, vol. 20, (1982); pp. 441-455.

(Continued)

Primary Examiner — Nathan M Nutter
(74) Attorney, Agent, or Firm — Lawrence T. Kale

(57) ABSTRACT

This disclosure relates to rotomolded articles, having a wall structure, where the wall structure contains at least one layer containing an ethylene interpolymer product, or a blend containing an ethylene interpolymer product and an ethylene polymer, where the ethylene interpolymer product has a Dilution Index ($Y_d$) greater than 0 and improved Environmental Stress Crack Resistance (ESCR). The ethylene interpolymer product has a melt index from about 0.5 to about 15 dg/minute, a density from about 0.930 to about 0.955 g/cm$^3$, a polydispersity ($M_w/M_n$) from about 2 to about 6 and a CDBI$_{50}$ from about 50% to about 98%. Further, the ethylene interpolymer products are a blend of at least two ethylene interpolymers; where one ethylene interpolymer is produced with a single-site catalyst formulation and at least one ethylene interpolymer is produced with a heterogeneous catalyst formulation.

28 Claims, 11 Drawing Sheets

Related U.S. Application Data application No. 14/918,964, filed on Oct. 21, 2015, now Pat. No. 9,512,283.

(51) Int. Cl.

| | | |
|---|---|---|
| *C08F 4/655* | (2006.01) | |
| *B32B 3/26* | (2006.01) | |
| *B32B 27/32* | (2006.01) | |
| *C08L 23/08* | (2006.01) | |
| *C08J 5/00* | (2006.01) | |
| *B32B 7/12* | (2006.01) | |
| *B32B 27/08* | (2006.01) | |
| *B32B 27/34* | (2006.01) | |
| *C08F 210/16* | (2006.01) | |
| *C08F 4/659* | (2006.01) | |
| *C08F 4/658* | (2006.01) | |
| *C08F 4/6592* | (2006.01) | |
| *C08F 2/06* | (2006.01) | |
| *B29C 41/04* | (2006.01) | |
| *C08F 2/00* | (2006.01) | |
| *B29C 41/22* | (2006.01) | |
| *C08L 23/14* | (2006.01) | |
| *C08F 210/14* | (2006.01) | |
| *B29K 23/00* | (2006.01) | |
| *B29K 105/00* | (2006.01) | |

(52) U.S. Cl.
CPC .............. *B32B 7/12* (2013.01); *B32B 27/08* (2013.01); *B32B 27/327* (2013.01); *B32B 27/34* (2013.01); *C08F 2/001* (2013.01); *C08F 2/06* (2013.01); *C08F 4/6555* (2013.01); *C08F 4/6583* (2013.01); *C08F 4/6585* (2013.01); *C08F 4/6592* (2013.01); *C08F 4/65904* (2013.01); *C08F 210/16* (2013.01); *C08J 5/00* (2013.01); *C08L 23/08* (2013.01); *C08L 23/0815* (2013.01); *C08L 23/14* (2013.01); *C08L 23/20* (2013.01); *B29K 2023/08* (2013.01); *B29K 2105/0058* (2013.01); *B29K 2105/0085* (2013.01); *B29K 2105/0094* (2013.01); *B29K 2905/02* (2013.01); *B29K 2995/0063* (2013.01); *B29K 2995/0088* (2013.01); *B32B 2307/7265* (2013.01); *B32B 2439/40* (2013.01); *C08F 4/65908* (2013.01); *C08F 4/65912* (2013.01); *C08F 210/14* (2013.01); *C08F 2420/01* (2013.01); *C08F 2420/04* (2013.01); *C08F 2500/03* (2013.01); *C08F 2500/09* (2013.01); *C08F 2500/11* (2013.01); *C08F 2500/12* (2013.01); *C08F 2500/13* (2013.01); *C08F 2500/17* (2013.01); *C08F 2500/18* (2013.01); *C08F 2500/26* (2013.01); *C08J 2323/06* (2013.01); *C08J 2323/08* (2013.01); *C08J 2323/20* (2013.01); *C08J 2323/24* (2013.01); *C08J 2423/08* (2013.01); *C08J 2423/20* (2013.01); *C08J 2423/24* (2013.01); *C08L 2203/16* (2013.01); *C08L 2205/025* (2013.01); *C08L 2205/03* (2013.01); *C08L 2205/06* (2013.01); *C08L 2314/02* (2013.01); *C08L 2314/06* (2013.01)

(56) References Cited

U.S. PATENT DOCUMENTS

| | | |
|---|---|---|
| 5,792,534 A | 8/1998 | deGroot et al. |
| 5,844,045 A | 12/1998 | Kolthammer et al. |
| 5,847,053 A | 12/1998 | Chum et al. |
| 5,869,575 A | 2/1999 | Kolthammer et al. |
| 5,874,139 A | 2/1999 | Bosiers et al. |
| 5,986,028 A | 11/1999 | Lai et al. |
| 6,025,448 A | 2/2000 | Swindoll et al. |
| 6,111,023 A | 8/2000 | Chum et al. |
| 6,127,484 A | 10/2000 | Cribbs et al. |
| 6,136,924 A | 10/2000 | Promel |
| 6,218,472 B1 | 4/2001 | Debras et al. |
| 6,221,982 B1 | 4/2001 | Debras et al. |
| 6,262,195 B1 | 7/2001 | Dall'Occo et al. |
| 6,306,969 B1 | 10/2001 | Patel et al. |
| 6,316,549 B1 | 11/2001 | Chum et al. |
| 6,346,575 B1 | 2/2002 | Debras et al. |
| 6,388,017 B1 | 5/2002 | McDaniel et al. |
| 6,403,717 B1 | 6/2002 | Adams et al. |
| 6,416,833 B1 | 7/2002 | Climenhage et al. |
| 6,433,095 B1 | 8/2002 | Laurent |
| 6,441,116 B1 | 8/2002 | Shikuma et al. |
| 6,448,341 B1 | 9/2002 | Kolthammer et al. |
| 6,462,135 B1 | 10/2002 | Rohde et al. |
| 6,462,136 B1 | 10/2002 | Saito et al. |
| 6,469,103 B1 | 10/2002 | Jain et al. |
| 6,479,589 B2 | 11/2002 | Debras et al. |
| 6,479,609 B1 | 11/2002 | Dall'Occo et al. |
| 6,489,427 B1 | 12/2002 | Clutton et al. |
| 6,506,867 B1 | 1/2003 | Lai et al. |
| 6,534,612 B1 | 3/2003 | Lai et al. |
| 6,538,070 B1 | 3/2003 | Cardwell et al. |
| 6,555,631 B1 | 4/2003 | Wang et al. |
| 6,566,446 B1 | 5/2003 | Parikh et al. |
| 6,566,450 B2 | 5/2003 | Dabras et al. |
| 6,569,948 B2 | 5/2003 | Laurent |
| 6,579,922 B2 | 6/2003 | Laurent |
| 6,657,026 B1 | 12/2003 | Kimberley et al. |
| 6,683,149 B2 | 1/2004 | Jain et al. |
| 6,723,398 B1 | 4/2004 | Chum et al. |
| 6,730,751 B2 | 5/2004 | Shamshoum et al. |
| 6,780,954 B2 | 8/2004 | Lai et al. |
| 6,828,395 B1 | 12/2004 | Ehrman et al. |
| 6,844,398 B2 | 1/2005 | Shikuma et al. |
| 6,875,816 B2 | 4/2005 | DeGroot et al. |
| 6,906,141 B2 | 6/2005 | Chum et al. |
| 6,908,968 B2 | 6/2005 | Jain et al. |
| 6,916,883 B2 | 7/2005 | Parikh et al. |
| 6,921,795 B2 | 7/2005 | Wang et al. |
| 6,921,799 B1 | 7/2005 | Follestad et al. |
| 6,924,342 B2 | 8/2005 | Stevens et al. |
| 6,969,741 B2 | 11/2005 | Lustiger et al. |
| 6,988,022 B2 | 1/2006 | Parrish et al. |
| 7,022,770 B2 | 4/2006 | Lustiger et al. |
| 7,101,939 B2 | 9/2006 | Nowlin et al. |
| 7,125,933 B2 | 10/2006 | German et al. |
| 7,148,304 B2 | 12/2006 | Kimberley et al. |
| 7,153,909 B2 | 12/2006 | Van Dun et al. |
| 7,166,676 B2 | 1/2007 | Jacobsen et al. |
| 7,230,054 B2 | 6/2007 | Mavridis et al. |
| 7,250,473 B2 | 7/2007 | Schramm et al. |
| 7,250,474 B2 | 7/2007 | Maziers |
| 7,271,221 B2 | 9/2007 | Stevens et al. |
| 7,300,983 B2 | 11/2007 | Degroot et al. |
| 7,432,328 B2 | 10/2008 | Jaker |
| 7,439,306 B2 | 10/2008 | Davis |
| 7,514,504 B2 | 4/2009 | Van Sinoy et al. |
| 7,645,835 B2 | 1/2010 | Van Dun et al. |
| 7,659,343 B2 | 2/2010 | Wooster et al. |
| 7,714,073 B2 | 5/2010 | Jacobsen et al. |
| 7,846,552 B2 | 12/2010 | Weeks |
| 7,858,702 B2 | 12/2010 | Jaker |
| 7,868,092 B2 | 1/2011 | Kwalk et al. |
| 7,906,451 B2 | 3/2011 | Citron et al. |
| 7,977,268 B2 | 7/2011 | Citron et al. |
| 7,999,039 B2 | 8/2011 | DeGroot et al. |
| 8,039,554 B2 | 10/2011 | Iseki et al. |
| 8,076,428 B2 | 12/2011 | Shim et al. |
| 8,101,685 B2 | 1/2012 | Jiang et al. |
| 8,101,687 B2 | 1/2012 | Schramm et al. |
| 8,410,217 B2 | 4/2013 | Tse et al. |
| 8,426,525 B2 | 4/2013 | Nozue et al. |
| 8,475,898 B2 | 7/2013 | Wang et al. |
| 9,512,283 B2* | 12/2016 | Wang et al. ............ B32B 3/266 |

(56) References Cited

U.S. PATENT DOCUMENTS

| | | |
|---|---|---|
| 9,695,309 B2 * | 7/2017 | Bellehumeur et al. . B32B 3/266 |
| 2002/0177677 A1 | 11/2002 | Kanamori et al. |
| 2003/0114595 A1 | 6/2003 | Van Dun et al. |
| 2003/0149181 A1 | 8/2003 | Kolthammer et al. |
| 2005/0119413 A1 | 6/2005 | Maziers |
| 2006/0036041 A1 | 2/2006 | Kwalk |
| 2007/0010626 A1 | 1/2007 | Shankernarayanan et al. |
| 2009/0062463 A1 | 3/2009 | Backmann et al. |
| 2009/0099315 A1 | 4/2009 | Kipke et al. |
| 2010/0304052 A1 | 12/2010 | Chai et al. |
| 2012/0065335 A1 | 3/2012 | Kipke et al. |
| 2012/0252989 A1 | 10/2012 | Dewachter et al. |
| 2012/0309910 A1 | 12/2012 | Dewachter et al. |
| 2013/0085231 A1 | 4/2013 | Lue et al. |
| 2017/0044357 A1 * | 2/2017 | Wang et al. ............ B32B 3/266 |

FOREIGN PATENT DOCUMENTS

| | | |
|---|---|---|
| EP | 0 989 140 A1 | 3/2000 |
| EP | 0 905 153 B1 | 3/2004 |
| EP | 1 961 777 A1 | 8/2008 |
| WO | 94/26816 A1 | 11/1994 |
| WO | 98/21276 A1 | 5/1998 |
| WO | 98/26000 A1 | 6/1998 |
| WO | 99/33913 A1 | 7/1999 |
| WO | 00/14129 A1 | 3/2000 |
| WO | 01/05852 A1 | 1/2001 |
| WO | 2006/045550 A1 | 5/2006 |
| WO | 2007/045415 A1 | 4/2007 |
| WO | 2009/040139 A1 | 4/2009 |
| WO | 2011/092266 A1 | 8/2011 |
| WO | 2012/004422 A1 | 1/2012 |
| WO | 2012/112259 A2 | 8/2012 |
| WO | 2012/119954 A1 | 9/2012 |
| WO | 2012/119956 A1 | 9/2012 |
| WO | 2012/133717 A1 | 10/2012 |
| WO | 2013/009514 A1 | 1/2013 |

OTHER PUBLICATIONS

ASTM E313-10; Standard Practice for Calculating Yellowness and Whiteness Indices from Instrumentally Measured Color Coordinates; ASTM International; Current edition approved Jul. 1, 2010. Published Jul. 2010. Originally approved in 1967. Last previous edition approved in 2005 as E313-05. pp. 1-6.

ASTM D1238-10; Standard Test Method for Melt Flow Rates of Thermoplastics by Extrusion Plastometer; ASTM International; Current edition approved Feb. 1, 2010. Published Mar. 2010. Originally approved in 1965. Last previous edition approved in 2004 as D1238-04c.pp. 1-15.

ASTM D792-13; Standard Test Methods for Density and Specific Gravity (Relative Density) of Plastics by Displacement; ASTM International; Current edition approved Nov. 1, 2013. Published Nov. 2013. Originally approved in 1944. Last previous edition approved in 2008 as D792-08. pp. 1-6.

ASTM D6474-12; Standard Test Method for Determining Molecular Weight Distribution and Molecular Weight Averages of Polyolefins by High Temperature Gel Permeation Chromatography; ASTM International; Current edition approved Dec. 15, 2012. Published Dec. 2012. Originally approved in 1999. Last previous edition approved in 2006 as D6474-99(2006). pp. 1-6.

* cited by examiner

ROTOMOLDED ARTICLES

CROSS-REFERENCE TO RELATED PATENT APPLICATION

This application is a continuation-in-part of U.S. application Ser. No. 15/335,485, filed on Oct. 27, 2016, entitled "Rotomolded Articles" which is a continuation of U.S. application Ser. No. 14/918,964, filed on Oct. 21, 2015, entitled "Rotomolded Articles", which was granted as U.S. Pat. No. 9,512,283 on Dec. 6, 2016, which claims priority to Canadian Patent Application No. CA 2,868,640, filed Oct. 21, 2014 and entitled "Solution Polymerization Process" which are herein incorporated by reference in their entirety.

FIELD

This disclosure relates to rotomolded articles containing at least one ethylene interpolymer product manufactured in a continuous solution polymerization process utilizing at least two reactors employing at least one single-site catalyst formulation and at least one heterogeneous catalyst formulation to produce manufactured articles having improved Environmental Stress Crack Resistance (ESCR).

BACKGROUND

Ethylene interpolymers products are widely used in rotomolding applications to produce a wide variety of manufactured articles. Non-limiting examples of rotomolded articles include: toys, bins, containers, helmets, boats, large tanks. Such articles are produced using rotomolding equipment, non-limiting examples include: clamshell machines, shuttle machines, swing arm machines, carousel machines and the like. There is a need to improve the Environmental Stress Crack Resistance (ESCR) of rotomolding articles, while maintaining the stiffness and impact properties, for example ARM Impact at low temperatures (−40° C.). It is well known to those of ordinary experience in the art that the stiffness of a rotomolded article can be increased by increasing the density of the ethylene interpolymer; however, it is also well known that ESCR decreases as density increases.

High ESCR in a rotomolding resin is particularly important when making rotomolded containers that hold chemicals. Non-limiting examples of chemicals include detergents, glycols, sulfuric acid, sodium hydroxide, hydrochloric acid, acetic acid, oils and fuels. Non-limiting examples of a rotomolded container size include from a few liters up to 300-500 gallons. In many applications, rotomolded containers also have complex shapes and such shapes require a high flow resin. By high flow resin, we mean a polymer having a melt flow index 12 from about 4 to about 6 dg/min (at 190° C. and 2.16 kg load). However, with increasing melt index (or decreasing weight average molecular weight) ESCR is reduced. Thus, the following is a technical challenge: designing and manufacturing high flow resins that produce rotomolded parts having excellent ESCR properties. The rotomolding resin disclosed herein are well suited to address this technical challenge.

The ethylene interpolymer products (rotomolding resins) disclosed were produced in a solution polymerization process, where catalyst components, solvent, monomers and hydrogen are fed under pressure to more than one reactor. For ethylene homo polymerization, or ethylene copolymerization, solution reactor temperatures can range from about 80° C. to about 300° C. while pressures generally range from about 3 MPag to about 45 MPag and the ethylene interpolymer produced remains dissolved in the solvent. The residence time of the solvent in the reactor is relatively short, for example, from about 1 second to about 20 minutes. The solution process can be operated under a wide range of process conditions that allow the production of a wide variety of ethylene interpolymers. Post reactor, the polymerization reaction is quenched to prevent further polymerization, by adding a catalyst deactivator, and passivated, by adding an acid scavenger. Once passivated, the polymer solution is forwarded to a polymer recovery operation where the ethylene interpolymer product is separated from process solvent, unreacted residual ethylene and unreacted optional α-olefin(s).

SUMMARY OF DISCLOSURE

This Application claims priority to Canadian Patent Application No. CA 2,868,640, filed Oct. 21, 2014 and entitled "SOLUTION POLYMERIZATION PROCESS".

Embodiment of this disclosure include rotomolded articles having a wall structure, where the wall structure contains at least one layer containing an ethylene interpolymer product comprising:
  (i) a first ethylene interpolymer;
  (ii) a second ethylene interpolymer, and;
  (iii) optionally a third ethylene interpolymer;
wherein the ethylene interpolymer product has one or more of (1) through (3):
  (1) a Dilution Index, $Y_d$, greater than 0,
  (2) ≥0.03 terminal vinyl unsaturations per 100 carbon atoms,
  (3) ≥3 parts per million (ppm) of a total catalytic metal;
wherein a plaque molded from the ethylene interpolymer product is characterized as having,
  (a) passes an ESCR test Condition A100 and a comparative plaque fails the ESCR test Condition A100, where ESCR test Condition A100 is passed if a failure time $(F^A{}_{50})$ is ≥1000 hr or ESCR test Condition A100 is failed if said failure time $(F^A{}_{50})$ is <1000 hr and/or
  (b) passes an ESCR test Condition B100 and the comparative plaque fails said ESCR test Condition B100, where ESCR test Condition B100 is passed if a failure time $(F^B{}_{50})$ is ≥1000 hr or ESCR test Condition B100 is failed if the failure time $(F^B{}_{50})$ is <1000 hr;
wherein said comparative plaque comprises a comparative ethylene interpolymer product comprising a comparative first ethylene interpolymer, a comparative second ethylene interpolymer and optionally a comparative third ethylene interpolymer;
wherein the ethylene interpolymer product has a TREF weight fraction that elutes at ≤85° C., $wtF^{\leq 85}$, that is at least 10% higher relative to the comparative ethylene interpolymer product having a comparative TREF weight fraction that elutes at ≤85° C., $wtF_c{}^{\leq 85}$ and the first ethylene interpolymer has a weight average molecular weight, $1^{st} M_w$, that is at least 20% higher relative a comparative weight average molecular weight, $1^{st} (M_w)_c$, of the comparative first ethylene interpolymer. In this disclosure failure times $(F^A{}_{50})$ and $(F^B{}_{50})$ were estimated graphically as described in Annex A1 of ASTM D1693.

Further embodiments of the ethylene interpolymer product have a Dimensionless Modulus from about −0.16 to about −0.08.

Embodiment of this disclosure include rotomolded articles having a wall structure, where the wall structure comprises at least one layer comprising an ethylene interpolymer product characterized as having: a melt index from about 0.5 to about 15 dg/minute, where melt index is measured according to ASTM D1238 (2.16 kg load and 190° C.); a density from about 0.930 to about 0.955 g/cc; wherein density is measured according to ASTM D792; a GPC determined $M_w/M_n$ from about 2 to about 6 and a TREF determined $CDBI_{50}$ from about 50% to about 98%.

Embodiment of this disclosure include rotomolded articles having a wall structure, where the wall structure comprises at least one layer comprising an ethylene interpolymer product, where the ethylene interpolymer product contains: (i) from about 15 to about 60 weight percent of a first ethylene interpolymer that has a melt index from about 0.01 to about 200 dg/minute and a density from about 0.89 g/cm³ to about 0.975 g/cc; (ii) from about 30 to about 85 weight percent of a second ethylene interpolymer that has a melt index from about 0.3 to about 1000 dg/minute and a density from about 0.89 g/cm³ to about 0.975 g/cc, and; (iii) optionally from about 0 to about 30 weight percent of a third ethylene interpolymer that has a melt index from about 0.5 to about 2000 dg/minute and a density from about 0.89 to about 0.975 g/cc. Weight percent is the weight of the first, or the second or third ethylene interpolymer divided by the weight of the ethylene interpolymer product.

The ethylene interpolymer product disclosed herein further comprises from about 0.1 to about 2.0 mole percent of one or more α-olefin, where the one or more α-olefin are $C_3$ to $C_{10}$ α-olefins.

The ethylene interpolymer products disclosed herein contain: a first ethylene interpolymer that was synthesized using a single-site catalyst formulation; a second ethylene interpolymer that was synthesized using a first heterogeneous catalyst formulation, and (iii) optionally a third ethylene interpolymer that was synthesized using a first heterogeneous catalyst formulation or a second heterogeneous catalyst formulation. Non-limiting examples of the first and second heterogeneous catalyst formulation include an in-line Ziegler-Natta catalyst formulation or a batch Ziegler-Natta catalyst formulation.

Embodiment of this disclosure include rotomolded articles having a wall structure, where the wall structure comprises at least one layer comprising an ethylene interpolymer product, where the ethylene interpolymer product contains: (a) ≤1 part per million (ppm) of a metal A, where metal A originates from a single site catalyst formulation, and; (b) from about 3 to about 11 ppm of a metal B, where metal B originates from a first heterogeneous catalyst formulation. Optionally, the ethylene interpolymer product may contain a metal C and the total amount of (metal C+metal B) is from about 3 to about 11 ppm, where metal C originates from a second heterogeneous catalyst formulation. Non-limiting examples of metal A include one or more of titanium, zirconium or hafnium. Non-limiting examples of metal B and metal C include one or more of titanium, zirconium, hafnium, vanadium, niobium, tantalum, chromium, molybdenum, tungsten, manganese, technetium, rhenium, iron, ruthenium or osmium.

Further embodiments include ethylene interpolymer products containing a first ethylene interpolymer having a first $M_w/M_n$, a second ethylene interpolymer having a second $M_w/M_n$ and optionally a third ethylene interpolymer having a third $M_w/M_n$; where the first $M_w/M_n$ is lower than the second $M_w/M_n$ and the optional third $M_w/M_n$; where the second $M_w/M_n$ and the optional third $M_w/M_n$ are ≤4.0. Embodiments also include ethylene interpolymer products where the blending of the second ethylene interpolymer and the third ethylene interpolymer form an ethylene interpolymer blend having a fourth $M_w/M_n$; where the fourth $M_w/M_n$ is not broader than the second $M_w/M_n$.

Embodiments also include rotomolded articles containing an ethylene interpolymer product containing a first ethylene interpolymer having a first $CDBI_{50}$ from about 70 to about 98%, a second ethylene interpolymer having a second $CDBI_{50}$ from about 45 to about 98% and optionally a third ethylene interpolymer having a third $CDBI_{50}$ from about 35 to about 98%. Embodiments also include ethylene interpolymer compositions wherein the first $CDBI_{50}$ is higher than the second $CDBI_{50}$ and optionally the first $CDBI_{50}$ is higher than the third $CDBI_{50}$.

In this disclosure the ARM impact mean failure energy and the ARM impact ductility are measured at −40° C. according to ASTM D5628. In the ARM Impact test, a rotomolded part having an ARM Mean Failure Energy ≥120 lb·ft in combination with an ARM Ductility ≥50% was considered a good part. To be more clear, a wall structure having an ARM Mean Failure Energy ≥120 lb·ft and an ARM Ductility ≥50% passed the ARM Impact test; in contrast, a wall structure having an ARM Mean Failure Energy <120 lb·ft or an ARM Ductility <50% failed the ARM Impact test.

BRIEF DESCRIPTION OF FIGURES

The following Figures are presented for the purpose of illustrating selected embodiments of this disclosure; it being understood, that the embodiments shown do not limit this disclosure.

DEFINITION OF TERMS

Figure 1:
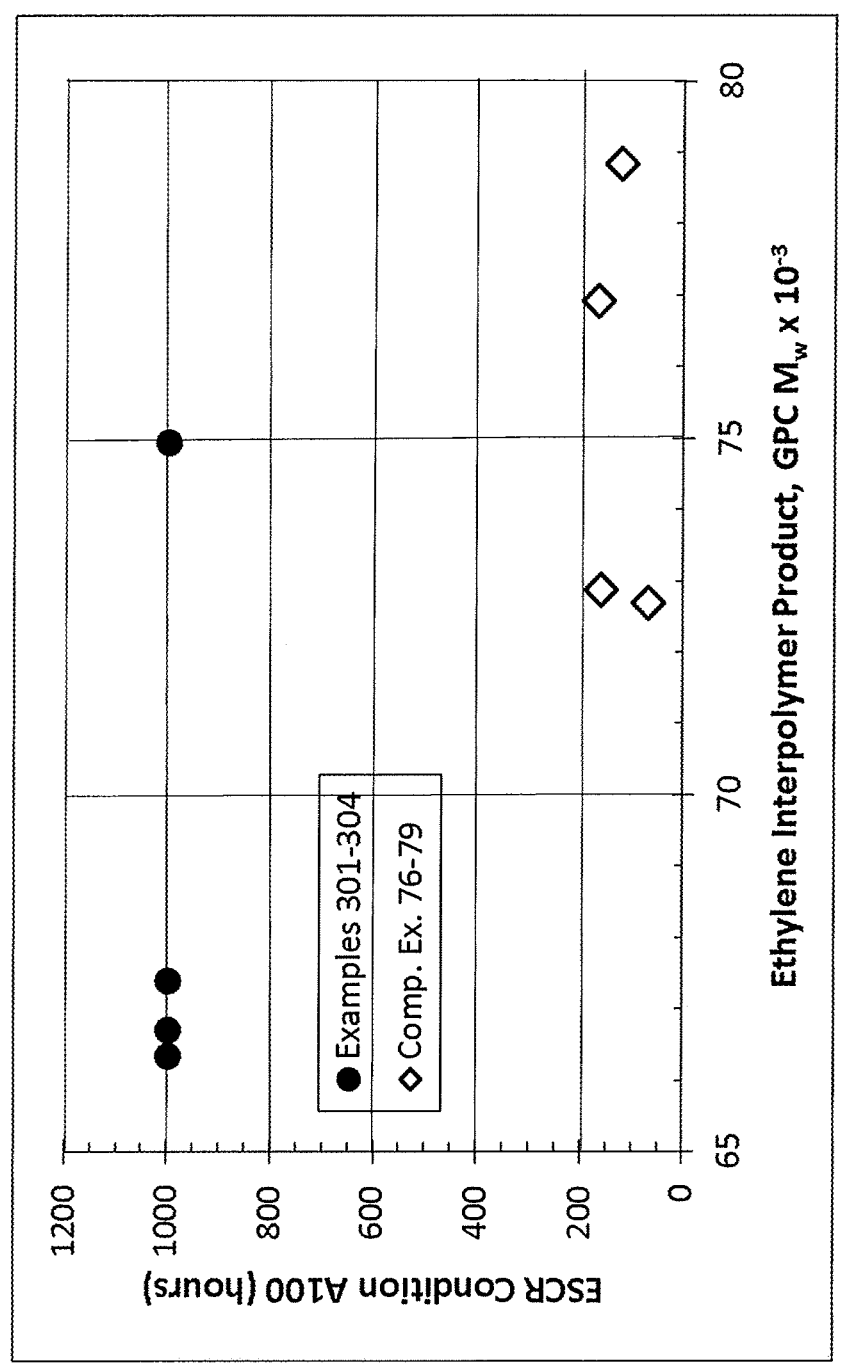
FIG. 1: Environmental Stress Crack Resistance (ESCR) Condition A100 versus GPC determined weight average molecular weight of ethylene interpolymer product Examples 301-304 and Comparative Examples 76-79.

Other than in the examples or where otherwise indicated, all numbers or expressions referring to quantities of ingredients, extrusion conditions, etc., used in the specification and claims are to be understood as modified in all instances by the term "about." Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

In order to form a more complete understanding of this disclosure the following terms are defined and should be used with the accompanying figures and the description of the various embodiments throughout.

The term "Dilution Index ($Y_d$)" and "Dimensionless Modulus ($X_d$)" are based on rheological measurements and are fully described in this disclosure.

As used herein, the term "monomer" refers to a small molecule that may chemically react and become chemically bonded with itself or other monomers to form a polymer.

As used herein, the term "α-olefin" is used to describe a monomer having a linear hydrocarbon chain containing from 3 to 20 carbon atoms having a double bond at one end of the chain.

As used herein, the term "ethylene polymer", refers to macromolecules produced from ethylene monomers and optionally one or more additional monomers; regardless of the specific catalyst or specific process used to make the ethylene polymer. In the polyethylene art, the one or more additional monomers are called "comonomer(s)" and often include α-olefins. The term "homopolymer" refers to a polymer that contains only one type of monomer. Common ethylene polymers include high density polyethylene (HDPE), medium density polyethylene (MDPE), linear low density polyethylene (LLDPE), very low density polyethylene (VLDPE), ultralow density polyethylene (ULDPE), plastomer and elastomers. The term ethylene polymer also includes polymers produced in a high pressure polymerization processes; non-limiting examples include low density polyethylene (LDPE), ethylene vinyl acetate copolymers (EVA), ethylene alkyl acrylate copolymers, ethylene acrylic acid copolymers and metal salts of ethylene acrylic acid (commonly referred to as ionomers). The term ethylene polymer also includes block copolymers which may include 2 to 4 comonomers. The term ethylene polymer also includes combinations of, or blends of, the ethylene polymers described above.

The term "ethylene interpolymer" refers to a subset of polymers within the "ethylene polymer" group that excludes polymers produced in high pressure polymerization processes; non-limiting examples of polymers produced in high pressure processes include LDPE and EVA (the latter is a copolymer of ethylene and vinyl acetate).

The term "heterogeneous ethylene interpolymers" refers to a subset of polymers in the ethylene interpolymer group that are produced using a heterogeneous catalyst formulation; non-limiting examples of which include Ziegler-Natta or chromium catalysts.

The term "homogeneous ethylene interpolymer" refers to a subset of polymers in the ethylene interpolymer group that are produced using metallocene or single-site catalysts. Typically, homogeneous ethylene interpolymers have narrow molecular weight distributions, for example gel permeation chromatography (GPC) $M_w/M_n$ values of less than 2.8; $M_w$ and $M_n$ refer to weight and number average molecular weights, respectively. In contrast, the $M_w/M_n$ of heterogeneous ethylene interpolymers are typically greater than the $M_w/M_n$ of homogeneous ethylene interpolymers. In general, homogeneous ethylene interpolymers also have a narrow comonomer distribution, i.e. each macromolecule within the molecular weight distribution has a similar comonomer content. Frequently, the composition distribution breadth index "CDBI" is used to quantify how the comonomer is distributed within an ethylene interpolymer, as well as to differentiate ethylene interpolymers produced with different catalysts or processes. The "$CDBI_{50}$" is defined as the percent of ethylene interpolymer whose composition is within 50% of the median comonomer composition; this definition is consistent with that described in U.S. Pat. No. 5,206,075 assigned to Exxon Chemical Patents Inc. The $CDBI_{50}$ of an ethylene interpolymer can be calculated from TREF curves (Temperature Rising Elution Fractionation); the TREF method is described in Wild, et al., J. Polym. Sci., Part B, Polym. Phys., Vol. 20 (3), pages 441-455. Typically the $CDBI_{50}$ of homogeneous ethylene interpolymers are greater than about 70%. In contrast, the $CDBI_{50}$ of α-olefin containing heterogeneous ethylene interpolymers are generally lower than the $CDBI_{50}$ of homogeneous ethylene interpolymers.

It is well known to those skilled in the art, that homogeneous ethylene interpolymers are frequently further subdivided into "linear homogeneous ethylene interpolymers" and "substantially linear homogeneous ethylene interpolymers". These two subgroups differ in the amount of long chain branching: more specifically, linear homogeneous ethylene interpolymers have less than about 0.01 long chain branches per 1000 carbon atoms; while substantially linear ethylene interpolymers have greater than about 0.01 to about 3.0 long chain branches per 1000 carbon atoms. A long chain branch is macromolecular in nature, i.e. similar in length to the macromolecule that the long chain branch is attached to.

Hereinafter, in this disclosure, the term "homogeneous ethylene interpolymer" refers to both linear homogeneous ethylene interpolymers and substantially linear homogeneous ethylene interpolymers.

Herein, the term "polyolefin" includes ethylene polymers and propylene polymers; non-limiting examples of propylene polymers include isotactic, syndiotactic and atactic propylene homopolymers, random propylene copolymers containing at least one comonomer and impact polypropylene copolymers or heterophasic polypropylene copolymers.

The term "thermoplastic" refers to a polymer that becomes liquid when heated, will flow under pressure and solidify when cooled. Thermoplastic polymers include ethylene polymers as well as other polymers commonly used in the plastic industry; non-limiting examples of other polymers commonly used include barrier resins (EVOH), tie resins, polyethylene terephthalate (PET), polyamides and the like.

As used herein the term "monolayer" refers a rotomolded article where the wall structure comprises a single layer.

As used herein, the terms "hydrocarbyl", "hydrocarbyl radical" or "hydrocarbyl group" refers to linear or cyclic, aliphatic, olefinic, acetylenic and aryl (aromatic) radicals comprising hydrogen and carbon that are deficient by one hydrogen.

As used herein, an "alkyl radical" includes linear, branched and cyclic paraffin radicals that are deficient by one hydrogen radical; non-limiting examples include methyl (—$CH_3$) and ethyl (—$CH_2CH_3$) radicals. The term "alkenyl radical" refers to linear, branched and cyclic hydrocarbons containing at least one carbon-carbon double bond that is deficient by one hydrogen radical.

Herein the term "R1" and its superscript form "$^{R1}$" refers to a first reactor in a continuous solution polymerization process; it being understood that R1 is distinctly different from the symbol $R^1$; the latter is used in chemical formula, e.g. representing a hydrocarbyl group. Similarly, the term "R2" and it's superscript form "$^{R2}$" refers to a second reactor, and; the term "R3" and it's superscript form "$^{R3}$" refers to a third reactor.

DETAILED DESCRIPTION

Catalysts

Organometallic catalyst formulations that are efficient in polymerizing olefins are well known in the art. In the embodiments disclosed herein, at least two catalyst formulations are employed in a continuous solution polymerization process. One of the catalyst formulations is a single-site catalyst formulation that produces a first ethylene interpolymer. The other catalyst formulation is a heterogeneous catalyst formulation that produces a second ethylene interpolymer. Optionally a third ethylene interpolymer is produced using the heterogeneous catalyst formulation that was used to produce the second ethylene interpolymer, or a different heterogeneous catalyst formulation may be used to produce the third ethylene interpolymer. In the continuous solution process, the at least one homogeneous ethylene interpolymer and the at least one heterogeneous ethylene interpolymer are solution blended and an ethylene interpolymer product is produced.

Single Site Catalyst Formulation

The catalyst components which make up the single site catalyst formulation are not particularly limited, i.e. a wide variety of catalyst components can be used. One non-limiting embodiment of a single site catalyst formulation comprises the following three or four components: a bulky ligand-metal complex; an alumoxane co-catalyst; an ionic activator and optionally a hindered phenol. In Table 1A of this disclosure: "(i)" refers to the amount of "component (i)", i.e. the bulky ligand-metal complex added to R1; "(ii)" refers to "component (ii)", i.e. the alumoxane co-catalyst; "(iii)" refers to "component (iii)" i.e. the ionic activator, and; "(iv)" refers to "component (iv)", i.e. the optional hindered phenol.

Non-limiting examples of component (i) are represented by formula (I):

$$(L^A)_a M(PI)_b (Q)_n \qquad (I)$$

wherein ($L^A$) represents a bulky ligand; M represents a metal atom; PI represents a phosphinimine ligand; Q represents a leaving group; a is 0 or 1; b is 1 or 2; (a+b)=2; n is 1 or 2, and; the sum of (a+b+n) equals the valance of the metal M.

Non-limiting examples of the bulky ligand $L^A$ in formula (I) include unsubstituted or substituted cyclopentadienyl ligands or cyclopentadienyl-type ligands, heteroatom substituted and/or heteroatom containing cyclopentadienyl-type ligands. Additional non-limiting examples include, cyclopentaphenanthreneyl ligands, unsubstituted or substituted indenyl ligands, benzindenyl ligands, unsubstituted or substituted fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine, pyrrolyl ligands, pyrozolyl ligands, carbazolyl ligands, borabenzene ligands and the like, including hydrogenated versions thereof, for example tetrahydroindenyl ligands. In other embodiments, $L^A$ may be any other ligand structure capable of η-bonding to the metal M, such embodiments include both $η^3$-bonding and $η^5$-bonding to the metal M. In other embodiments, $L^A$ may comprise one or more heteroatoms, for example, nitrogen, silicon, boron, germanium, sulfur and phosphorous, in combination with carbon atoms to form an open, acyclic, or a fused ring, or ring system, for example, a heterocyclopentadienyl ancillary ligand. Other non-limiting embodiments for $L^A$ include bulky amides, phosphides, alkoxides, aryloxides, imides, carbolides, borollides, porphyrins, phthalocyanines, corrins and other polyazomacrocycles.

Non-limiting examples of metal M in formula (I) include Group 4 metals, titanium, zirconium and hafnium.

The phosphinimine ligand, PI, is defined by formula (II):

$$(R^p)_3 P{=}N{-} \qquad (II)$$

wherein the $R^p$ groups are independently selected from: a hydrogen atom; a halogen atom; $C_{1-20}$ hydrocarbyl radicals which are unsubstituted or substituted with one or more halogen atom(s); a $C_{1-8}$ alkoxy radical; a $C_{6-10}$ aryl radical; a $C_{6-10}$ aryloxy radical; an amido radical; a silyl radical of formula —$Si(R^s)_3$, wherein the $R^s$ groups are independently selected from, a hydrogen atom, a $C_{1-8}$ alkyl or alkoxy radical, a $C_{6-10}$ aryl radical, a $C_{6-10}$ aryloxy radical, or a germanyl radical of formula —$Ge(R^G)_3$, wherein the $R^G$ groups are defined as $R^s$ is defined in this paragraph.

The leaving group Q is any ligand that can be abstracted from formula (I) forming a catalyst species capable of polymerizing one or more olefin(s). An equivalent term for Q is an "activatable ligand", i.e. equivalent to the term "leaving group". In some embodiments, Q is a monoanionic labile ligand having a sigma bond to M. Depending on the oxidation state of the metal, the value for n is 1 or 2 such that formula (I) represents a neutral bulky ligand-metal complex. Non-limiting examples of Q ligands include a hydrogen atom, halogens, $C_{1-20}$ hydrocarbyl radicals, $C_{1-20}$ alkoxy radicals, $C_{5-10}$ aryl oxide radicals; these radicals may be linear, branched or cyclic or further substituted by halogen atoms, $C_{1-10}$ alkyl radicals, $C_{1-10}$ alkoxy radicals, $C_{6-10}$ aryl or aryloxy radicals. Further non-limiting examples of Q ligands include weak bases such as amines, phosphines, ethers, carboxylates, dienes, hydrocarbyl radicals having from 1 to 20 carbon atoms. In another embodiment, two Q ligands may form part of a fused ring or ring system.

Further embodiments of component (i) of the single site catalyst formulation include structural, optical or enantiomeric isomers (meso and racemic isomers) and mixtures thereof of the bulky ligand-metal complexes described in formula (I) above.

The second single site catalyst component, component (ii), is an alumoxane co-catalyst that activates component (i) to a cationic complex. An equivalent term for "alumoxane" is "aluminoxane"; although the exact structure of this co-catalyst is uncertain, subject matter experts generally agree that it is an oligomeric species that contain repeating units of the general formula (III):

$$(R)_2AlO\text{---}(Al(R)\text{---}O)_n\text{---}Al(R)_2 \quad (III)$$

where the R groups may be the same or different linear, branched or cyclic hydrocarbyl radicals containing 1 to 20 carbon atoms and n is from 0 to about 50. A non-limiting example of an alumoxane is methyl aluminoxane (or MAO) wherein each R group in formula (III) is a methyl radical.

The third catalyst component (iii) of the single site catalyst formation is an ionic activator. In general, ionic activators are comprised of a cation and a bulky anion; wherein the latter is substantially non-coordinating. Non-limiting examples of ionic activators are boron ionic activators that are four coordinate with four ligands bonded to the boron atom. Non-limiting examples of boron ionic activators include the following formulas (IV) and (V) shown below;

$$[R^5]^+[B(R^7)_4]^- \quad (IV)$$

where B represents a boron atom, $R^5$ is an aromatic hydrocarbyl (e.g. triphenyl methyl cation) and each $R^7$ is independently selected from phenyl radicals which are unsubstituted or substituted with from 3 to 5 substituents selected from fluorine atoms, $C_{1-4}$ alkyl or alkoxy radicals which are unsubstituted or substituted by fluorine atoms; and a silyl radical of formula —$Si(R^9)_3$, where each $R^9$ is independently selected from hydrogen atoms and $C_{1-4}$ alkyl radicals, and; compounds of formula (V);

$$[(R^8)_tZH]^+[B(R^7)_4]^- \quad (V)$$

where B is a boron atom, H is a hydrogen atom, Z is a nitrogen or phosphorus atom, t is 2 or 3 and $R^8$ is selected from $C_{1-8}$ alkyl radicals, phenyl radicals which are unsubstituted or substituted by up to three $C_{1-4}$ alkyl radicals, or one $R^8$ taken together with the nitrogen atom may form an anilinium radical and $R^7$ is as defined above in formula (IV).

In both formula (IV) and (V), a non-limiting example of $R^7$ is a pentafluorophenyl radical. In general, boron ionic activators may be described as salts of tetra(perfluorophenyl) boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators include: triethylammonium tetra(phenyl) boron, tripropylammonium tetra(phenyl)boron, tri(n-butyl) ammonium tetra(phenyl)boron, trimethylammonium tetra (p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene(diazonium)tetrakispentafluorophenyl borate, tropillium tetrakis(2,3,5,6-tetrafluorophenyl)borate, triphenylmethylium tetrakis(2,3,5,6-tetrafluorophenyl)borate, benzene(diazonium) tetrakis(3,4,5-trifluorophenyl)borate, tropillium tetrakis(3,4,5-trifluorophenyl)borate, benzene(diazonium) tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium) tetrakis(1,2,2-trifluoroethenyl)borate, tropillium tetrakis(2,3,4,5-tetrafluorophenyl)borate, triphenylmethylium tetrakis(2,3,4,5-tetrafluorophenyl)borate, and benzene(diazonium) tetrakis (2,3,4,5 tetrafluorophenyl)borate. Readily available commercial ionic activators include N,N-dimethylanilinium tetrakispentafluorophenyl borate, and triphenylmethylium tetrakispentafluorophenyl borate.

The optional fourth catalyst component of the single site catalyst formation is a hindered phenol, component (iv). Non-limiting example of hindered phenols include butylated phenolic antioxidants, butylated hydroxytoluene, 2,4-di-tertiarybutyl-6-ethyl phenol, 4,4'-methylenebis (2,6-di-tertiarybutylphenol), 1,3,5-trimethyl-2,4,6-tris(3,5-di-tert-butyl-4-hydroxybenzyl) benzene and octadecyl-3-(3',5'-di-tert-butyl-4'-hydroxyphenyl) propionate.

To produce an active single site catalyst formulation the quantity and mole ratios of the three or four components, (i) through (iv) are optimized as described below.

Heterogeneous Catalyst Formulations

A number of heterogeneous catalyst formulations are well known to those skilled in the art, including, as non-limiting examples, Ziegler-Natta and chromium catalyst formulations.

In this disclosure, embodiments include an in-line and batch Ziegler-Natta catalyst formulations. The term "in-line Ziegler-Natta catalyst formulation" refers to the continuous synthesis of a small quantity of active Ziegler-Natta catalyst and immediately injecting this catalyst into at least one continuously operating reactor, where the catalyst polymerizes ethylene and one or more optional α-olefins to form an ethylene interpolymer. The terms "batch Ziegler-Natta catalyst formulation" or "batch Ziegler-Natta procatalyst" refer to the synthesis of a much larger quantity of catalyst or procatalyst in one or more mixing vessels that are external to, or isolated from, the continuously operating solution polymerization process. Once prepared, the batch Ziegler-Natta catalyst formulation, or batch Ziegler-Natta procatalyst, is transferred to a catalyst storage tank. The term "procatalyst" refers to an inactive catalyst formulation (inactive with respect to ethylene polymerization); the procatalyst is converted into an active catalyst by adding an alkyl aluminum co-catalyst. As needed, the procatalyst is pumped from the storage tank to at least one continuously operating reactor, where an active catalyst is formed and polymerizes ethylene and one or more optional α-olefins to form an ethylene interpolymer. The procatalyst may be converted into an active catalyst in the reactor or external to the reactor.

A wide variety of chemical compounds can be used to synthesize an active Ziegler-Natta catalyst formulation. The following describes various chemical compounds that may be combined to produce an active Ziegler-Natta catalyst formulation. Those skilled in the art will understand that the embodiments in this disclosure are not limited to the specific chemical compound disclosed.

An active Ziegler-Natta catalyst formulation may be formed from: a magnesium compound, a chloride compound, a metal compound, an alkyl aluminum co-catalyst and an aluminum alkyl. In Table 1A of this disclosure: "(v)" refers to "component (v)" the magnesium compound; the term "(vi)" refers to the "component (vi)" the chloride compound; "(vii)" refers to "component (vii)" the metal compound; "(viii)" refers to "component (viii)" alkyl aluminum co-catalyst, and; "(ix)" refers to "component (ix)" the aluminum alkyl. As will be appreciated by those skilled in the art, Ziegler-Natta catalyst formulations may contain additional components; a non-limiting example of an additional component is an electron donor, e.g. amines or ethers.

A non-limiting example of an active in-line Ziegler-Natta catalyst formulation can be prepared as follows. In the first step, a solution of a magnesium compound (component (v)) is reacted with a solution of the chloride compound (component (vi)) to form a magnesium chloride support suspended in solution. Non-limiting examples of magnesium compounds include $Mg(R^1)_2$; wherein the $R^1$ groups may be the same or different, linear, branched or cyclic hydrocarbyl radicals containing 1 to 10 carbon atoms. Non-limiting examples of chloride compounds include $R^2Cl$; wherein $R^2$ represents a hydrogen atom, or a linear, branched or cyclic hydrocarbyl radical containing 1 to 10 carbon atoms. In the first step, the solution of magnesium compound may also contain an aluminum alkyl (component (ix)). Non-limiting examples of aluminum alkyl include $Al(R^3)_3$, wherein the $R^3$ groups may be the same or different, linear, branched or cyclic hydrocarbyl radicals containing from 1 to 10 carbon atoms. In the second step a solution of the metal compound (component (vii)) is added to the solution of magnesium chloride and the metal compound is supported on the magnesium chloride. Non-limiting examples of suitable metal compounds include $M(X)_n$ or $MO(X)_n$; where M represents a metal selected from Group 4 through Group 8 of the Periodic Table, or mixtures of metals selected from Group 4 through Group 8; O represents oxygen, and; X represents chloride or bromide; n is an integer from 3 to 6 that satisfies the oxidation state of the metal. Additional non-limiting examples of suitable metal compounds include Group 4 to Group 8 metal alkyls, metal alkoxides (which may be prepared by reacting a metal alkyl with an alcohol) and mixed-ligand metal compounds that contain a mixture of halide, alkyl and alkoxide ligands. In the third step a solution of an alkyl aluminum co-catalyst (component (viii)) is added to the metal compound supported on the magnesium chloride. A wide variety of alkyl aluminum co-catalysts are suitable, as expressed by formula (VI):

$$Al(R^4)_p(OR^5)_q(X)_r \qquad (VI)$$

wherein the $R^4$ groups may be the same or different, hydrocarbyl groups having from 1 to 10 carbon atoms; the $OR^5$ groups may be the same or different, alkoxy or aryloxy groups wherein $R^5$ is a hydrocarbyl group having from 1 to 10 carbon atoms bonded to oxygen; X is chloride or bromide, and; (p+q+r)=3, with the proviso that p is greater than 0. Non-limiting examples of commonly used alkyl aluminum co-catalysts include trimethyl aluminum, triethyl aluminum, tributyl aluminum, dimethyl aluminum methoxide, diethyl aluminum ethoxide, dibutyl aluminum butoxide, dimethyl aluminum chloride or bromide, diethyl aluminum chloride or bromide, dibutyl aluminum chloride or bromide and ethyl aluminum dichloride or dibromide.

The process described in the paragraph above, to synthesize an active in-line Ziegler-Natta catalyst formulation, can be carried out in a variety of solvents; non-limiting examples of solvents include linear or branched $C_5$ to $C_{12}$ alkanes or mixtures thereof. To produce an active in-line Ziegler-Natta catalyst formulation the quantity and mole ratios of the five components, (v) through (ix), are optimized as described below.

Additional embodiments of heterogeneous catalyst formulations include formulations where the "metal compound" is a chromium compound; non-limiting examples include silyl chromate, chromium oxide and chromocene. In some embodiments, the chromium compound is supported on a metal oxide such as silica or alumina. Heterogeneous catalyst formulations containing chromium may also include co-catalysts; non-limiting examples of co-catalysts include trialkylaluminum, alkylaluminoxane and dialkoxyalkylaluminum compounds and the like.

Solution Polymerization Process: In-Line Heterogeneous Catalyst Formulation

The ethylene interpolymer products disclosed herein, useful in the manufacture of rotomolded parts, were produced in a continuous solution polymerization process. This solution process has been fully described in Canadian Patent Application No. CA 2,868,640, filed Oct. 21, 2014 and entitled "SOLUTION POLYMERIZATION PROCESS"; which is incorporated by reference into this application in its entirety.

Embodiments of this process includes at least two continuously stirred reactors, R1 and R2 and an optional tubular reactor R3. Feeds (solvent, ethylene, at least two catalyst formulations, optional hydrogen and optional α-olefin) are feed to at least two reactor continuously. A single site catalyst formulation is injected into R1 and a first heterogeneous catalyst formation is injected into R2 and optionally R3. Optionally, a second heterogeneous catalyst formulation is injected into R3. The single site catalyst formulation includes an ionic activator (component (iii)), a bulky ligand-metal complex (component (i)), an alumoxane co-catalyst (component (ii)) and an optional hindered phenol (component (iv)), respectively.

R1 and R2 may be operated in series or parallel modes of operation. To be more clear, in series mode 100% of the effluent from R1 flows directly into R2. In parallel mode, R1 and R2 operate independently and the effluents from R1 and R2 are combined downstream of the reactors.

A heterogeneous catalyst formulation is injected into R2. In one embodiment a first in-line Ziegler-Natta catalyst formulation is injected into R2. A first in-line Ziegler-Natta catalyst formation is formed within a first heterogeneous catalyst assembly by optimizing the following molar ratios: (aluminum alkyl)/(magnesium compound) or (ix)/(v); (chloride compound)/(magnesium compound) or (vi)/(v); (alkyl aluminum co-catalyst)/(metal compound) or (viii)/(vii), and; (aluminum alkyl)/(metal compound) or (ix)/(vii); as well as the time these compounds have to react and equilibrate. Within the first heterogeneous catalyst assembly the time between the addition of the chloride compound and the addition of the metal compound (component (vii)) is controlled; hereinafter HUT-1 (the first Hold-Up-Time). The time between the addition of component (vii) and the addition of the alkyl aluminum co-catalyst, component (viii), is also controlled; hereinafter HUT-2 (the second Hold-Up-Time). In addition, the time between the addition of the alkyl aluminum co-catalyst and the injection of the in-line Ziegler-Natta catalyst formulation into R2 is controlled; hereinafter HUT-3 (the third Hold-Up-Time). Optionally, 100% the alkyl aluminum co-catalyst, may be injected directly into R2. Optionally, a portion of the alkyl aluminum co-catalyst may be injected into the first heterogeneous catalyst assembly and the remaining portion injected directly into R2. The quantity of in-line heterogeneous catalyst formulation added to R2 is expressed as the parts-per-million (ppm) of metal compound (component (vii)) in the reactor solution, hereinafter "R2 (vii) (ppm)". Injection of the in-line heterogeneous catalyst formulation into R2 produces a second ethylene interpolymer in a second exit stream (exiting R2). Optionally the second exit stream is deactivated by adding a catalyst deactivator. If the second exit stream is not deactivated the second exit stream enters reactor R3. One embodiment of a suitable R3 design is a tubular reactor. Optionally, one or more of the following fresh feeds may be injected into R3; solvent, ethylene, hydrogen, α-olefin and a first or second heterogeneous catalyst formulation; the latter is supplied from a second heterogeneous catalyst assembly. The chemical composition of the first and second heterogeneous catalyst formulations may be the same, or different, i.e. the catalyst components ((v) through (ix)), mole ratios and hold-up-times may differ in the first and second heterogeneous catalyst assemblies. The second heterogeneous catalyst assembly generates an efficient catalyst by optimizing hold-up-times and the molar ratios of the catalyst components.

In reactor R3, a third ethylene interpolymer may, or may not, form. A third ethylene interpolymer will not form if a catalyst deactivator is added upstream of reactor R3. A third ethylene interpolymer will be formed if a catalyst deactivator is added downstream of R3. The optional third ethylene interpolymer may be formed using a variety of operational modes (with the proviso that catalyst deactivator is not added upstream). Non-limiting examples of operational modes include: (a) residual ethylene, residual optional α-olefin and residual active catalyst entering R3 react to form the third ethylene interpolymer, or; (b) fresh process solvent, fresh ethylene and optionally fresh α-olefin are added to R3 and the residual active catalyst entering R3 forms the third ethylene interpolymer, or; (c) a second in-line heterogeneous catalyst formulation is added to R3 to polymerize residual ethylene and residual optional α-olefin to form the third ethylene interpolymer, or; (d) fresh process solvent, ethylene, optional α-olefin and a second in-line heterogeneous catalyst formulation are added to R3 to form the third ethylene interpolymer.

In series mode, R3 produces a third exit stream containing the first ethylene interpolymer, the second ethylene interpolymer and optionally a third ethylene interpolymer. A catalyst deactivator may be added to the third exit stream producing a deactivated solution; with the proviso a catalyst deactivator is not added if a catalyst deactivator was added upstream of R3.

The deactivated solution passes through a pressure let down device, a heat exchanger and a passivator is added forming a passivated solution. The passivated solution passes through a series of vapor liquid separators and ultimately the ethylene interpolymer product enters polymer recover. Non-limiting examples of polymer recovery operations include one or more gear pump, single screw extruder or twin screw extruder that forces the molten ethylene interpolymer product through a pelletizer.

Embodiments of the manufactured articles disclosed herein, may also be formed from ethylene interpolymer products synthesized using a batch Ziegler-Natta catalyst. Typically, a first batch Ziegler-Natta procatalyst is injected into R2 and the procatalyst is activated within R2 by injecting an alkyl aluminum co-catalyst forming a first batch Ziegler-Natta catalyst. Optionally, a second batch Ziegler-Natta procatalyst is injected into R3.

Additional Solution Polymerization Process Parameters

A variety of solvents may be used as the process solvent; non-limiting examples include linear, branched or cyclic $C_5$ to $C_{12}$ alkanes. Non-limiting examples of α-olefins include $C_3$ to $C_{10}$ α-olefins. It is well known to individuals of ordinary experience in the art that reactor feed streams (solvent, monomer, α-olefin, hydrogen, catalyst formulation etc.) must be essentially free of catalyst deactivating poisons; non-limiting examples of poisons include trace amounts of oxygenates such as water, fatty acids, alcohols, ketones and aldehydes. Such poisons are removed from reactor feed streams using standard purification practices; non-limiting examples include molecular sieve beds, alumina beds and oxygen removal catalysts for the purification of solvents, ethylene and α-olefins, etc.

In operating the continuous solution polymerization process the total amount of ethylene supplied to the process can be portioned or split between the three reactors R1, R2 and R3. This operational variable is referred to as the Ethylene Split (ES), i.e. "$ES^{R1}$", "$ES^{R2}$" and "$ES^{R3}$" refer to the weight percent of ethylene injected in R1, R2 and R3, respectively; with the proviso that $ES^{R1}+ES^{R2}+ES^{R3}=100\%$. The ethylene concentration in each reactor is also controlled. The R1 ethylene concentration is defined as the weight of ethylene in reactor 1 divided by the total weight of everything added to reactor 1; the R2 ethylene concentration (wt %) and R3 ethylene concentration (wt %) are defined similarly. The total amount of ethylene converted in each reactor is monitored. The term "$Q^{R1}$" refers to the percent of the ethylene added to R1 that is converted into an ethylene interpolymer by the catalyst formulation. Similarly $Q^{R2}$ and $Q^{R3}$ represent the percent of the ethylene added to R2 and R3 that was converted into ethylene interpolymer, in the respective reactor. The term "$Q^T$" represents the total or overall ethylene conversion across the entire continuous solution polymerization plant; i.e. $Q^T=100\times$[weight of ethylene in the interpolymer product]/([weight of ethylene in the interpolymer product]+[weight of unreacted ethylene]). Optionally, α-olefin may be added to the continuous solution polymerization process. If added, α-olefin may be proportioned or split between R1, R2 and R3. This operational variable is referred to as the Comonomer Split (CS), i.e. "$CS^{R1}$", "$CS^{R2}$" and "$CS^{R3}$" refer to the weight percent of α-olefin comonomer that is injected in R1, R2 and R3, respectively; with the proviso that $CS^{R1}+CS^{R2}+CS^{R3}=100\%$.

In the continuous polymerization processes described, polymerization is terminated by adding a catalyst deactivator. The catalyst deactivator substantially stops the polymerization reaction by changing active catalyst species to inactive forms. Suitable deactivators are well known in the art, non-limiting examples include: amines (e.g. U.S. Pat. No. 4,803,259 to Zboril et al.); alkali or alkaline earth metal salts of carboxylic acid (e.g. U.S. Pat. No. 4,105,609 to Machan et al.); water (e.g. U.S. Pat. No. 4,731,438 to Bernier et al.); hydrotalcites, alcohols and carboxylic acids (e.g. U.S. Pat. No. 4,379,882 to Miyata); or a combination thereof (U.S. Pat. No. 6,180,730 to Sibtain et al.).

Prior to entering the vapor/liquid separator, a passivator or acid scavenger is added to deactivated solution. Suitable passivators are well known in the art, non-limiting examples include alkali or alkaline earth metal salts of carboxylic acids or hydrotalcites.

In this disclosure, the number of solution reactors is not particularly important; with the proviso that the continuous solution polymerization process comprises at least two reactors that employ at least one single-site catalyst formulation and at least one heterogeneous catalyst formulation.

First Ethylene Interpolymer

The first ethylene interpolymer is produced with a single-site catalyst formulation. If the optional α-olefin is not added to reactor 1 (R1), then the ethylene interpolymer produced in R1 is an ethylene homopolymer. If an α-olefin is added, the following weight ratio is one parameter to control the density of the first ethylene interpolymer: $((\alpha\text{-olefin})/(\text{ethylene}))^{R1}$. The symbol "$\sigma^1$" refers to the density of the first ethylene interpolymer produced in R1. The upper limit on al may be about 0.975 g/cm$^3$; in some cases about 0.965 g/cm$^3$ and; in other cases about 0.955 g/cm$^3$. The lower limit on $\sigma^1$ may be about 0.855 g/cm$^3$, in some cases about 0.865 g/cm$^3$, and; in other cases about 0.875 g/cm$^3$.

Methods to determine the CDBI$_{50}$ (Composition Distribution Branching Index) of an ethylene interpolymer are well known to those skilled in the art. The CDBI$_{50}$, expressed as a percent, is defined as the percent of the ethylene interpolymer whose comonomer composition is within 50% of the median comonomer composition. It is also well known to those skilled in the art that the CDBI$_{50}$ of ethylene interpolymers produced with single-site catalyst formulations are higher relative to the CDBI$_{50}$ of α-olefin containing ethylene interpolymers produced with heterogeneous catalyst formulations. The upper limit on the CDBI$_{50}$ of the first ethylene interpolymer (produced with a single-site catalyst formulation) may be about 98%, in other cases about 95% and in still other cases about 90%. The lower limit on the CDBI$_{50}$ of the first ethylene interpolymer may be about 70%, in other cases about 75% and in still other cases about 80%.

As is well known to those skilled in the art the $M_w/M_n$ of ethylene interpolymers produced with single site catalyst formulations are lower relative to ethylene interpolymers produced with heterogeneous catalyst formulations. Thus, in the embodiments disclosed, the first ethylene interpolymer has a lower $M_w/M_n$ relative to the second ethylene interpolymer; where the second ethylene interpolymer is produced with a heterogeneous catalyst formulation. The upper limit on the $M_w/M_n$ of the first ethylene interpolymer may be about 2.8, in other cases about 2.5 and in still other cases about 2.2. The lower limit on the $M_w/M_n$ the first ethylene interpolymer may be about 1.7, in other cases about 1.8 and in still other cases about 1.9.

The first ethylene interpolymer contains catalyst residues that reflect the chemical composition of the single-site catalyst formulation used. Those skilled in the art will understand that catalyst residues are typically quantified by the parts per million of metal in the first ethylene interpolymer, where metal refers to the metal in component (i), i.e. the metal in the "bulky ligand-metal complex"; hereinafter this metal will be referred to "metal A". As recited earlier in this disclosure, non-limiting examples of metal A include Group 4 metals, titanium, zirconium and hafnium. The upper limit on the ppm of metal A in the first ethylene interpolymer may be about 1.0 ppm, in other cases about 0.9 ppm and in still other cases about 0.8 ppm. The lower limit on the ppm of metal A in the first ethylene interpolymer may be about 0.01 ppm, in other cases about 0.1 ppm and in still other cases about 0.2 ppm.

The amount of hydrogen added to R1 can vary over a wide range allowing the continuous solution process to produce first ethylene interpolymers that differ greatly in melt index, hereinafter $I_2^1$ (melt index is measured at 190° C. using a 2.16 kg load following the procedures outlined in ASTM D1238). The quantity of hydrogen added to R1 is expressed as the parts-per-million (ppm) of hydrogen in R1 relative to the total mass in reactor R1; hereinafter $H_2^{R1}$ (ppm). The upper limit on $I_2^1$ may be about 200 dg/min, in some cases about 100 dg/min; in other cases about 50 dg/min, and; in still other cases about 1 dg/min. The lower limit on $I_2^1$ may be about 0.01 dg/min, in some cases about 0.05 dg/min; in other cases about 0.1 dg/min, and; in still other cases about 0.5 dg/min.

The upper limit on the weight percent (wt %) of the first ethylene interpolymer in the ethylene interpolymer product may be about 60 wt %, in other cases about 55 wt % and in still other cases about 50 wt %. The lower limit on the wt % of the first ethylene interpolymer in the ethylene interpolymer product may be about 15 wt %; in other cases about 25 wt % and in still other cases about 30 wt %.

Second Ethylene Interpolymer

If optional α-olefin is not added to reactor 2 (R2) either by adding fresh α-olefin to R2 (or carried over from R1) then the ethylene interpolymer produced in R2 is an ethylene homopolymer. If an optional α-olefin is present in R2, the following weight ratio is one parameter to control the density of the second ethylene interpolymer produced in R2: $((\alpha\text{-olefin})/(\text{ethylene}))^{R2}$. Hereinafter, the symbol "$\sigma^2$" refers to the density of the ethylene interpolymer produced in R2. The upper limit on $\sigma^2$ may be about 0.975 g/cm$^3$; in some cases about 0.965 g/cm$^3$ and; in other cases about 0.955 g/cm$^3$. Depending on the heterogeneous catalyst formulation used, the lower limit on $\sigma^2$ may be about 0.89 g/cm$^3$, in some cases about 0.90 g/cm$^3$, and; in other cases about 0.91 g/cm$^3$.

A heterogeneous catalyst formulation is used to produce the second ethylene interpolymer. If the second ethylene interpolymer contains an α-olefin, the CDBI$_{50}$ of the second ethylene interpolymer is lower relative to the CDBI$_{50}$ of the first ethylene interpolymer that was produced with a single-site catalyst formulation. In an embodiment of this disclosure, the upper limit on the CDBI$_{50}$ of the second ethylene interpolymer (that contains an α-olefin) may be about 70%, in other cases about 65% and in still other cases about 60%. In an embodiment of this disclosure, the lower limit on the CDBI$_{50}$ of the second ethylene interpolymer (that contains an α-olefin) may be about 45%, in other cases about 50% and in still other cases about 55%. If an α-olefin is not added to the continuous solution polymerization process the second ethylene interpolymer is an ethylene homopolymer. In the case of a homopolymer, which does not contain α-olefin, one can still measure a CDBI$_{50}$ using TREF. In the case of a homopolymer, the upper limit on the CDBI$_{50}$ of the second ethylene interpolymer may be about 98%, in other cases about 96% and in still other cases about 95%, and; the lower limit on the CDBI$_{50}$ may be about 88%, in other cases about 89% and in still other cases about 90%. It is well known to those skilled in the art that as the α-olefin content in the second ethylene interpolymer approaches zero, there is a smooth transition between the recited $CDBI_{50}$ limits for the second ethylene interpolymers (that contain an α-olefin) and the recited $CDBI_{50}$ limits for the second ethylene interpolymers that are ethylene homopolymers. Typically, the $CDBI_{50}$ of the first ethylene interpolymer is higher than the $CDBI_{50}$ of the second ethylene interpolymer.

The $M_w/M_n$ of second ethylene interpolymer is higher than the $M_w/M_n$ of the first ethylene interpolymer. The upper limit on the $M_w/M_n$ of the second ethylene interpolymer may be about 4.4, in other cases about 4.2 and in still other cases about 4.0. The lower limit on the $M_w/M_n$ of the second ethylene interpolymer may be about 2.2. $M_w/M_n$'s of 2.2 are observed when the melt index of the second ethylene interpolymer is high, or when the melt index of the ethylene interpolymer product is high, e.g. greater than 10 g/10 minutes. In other cases the lower limit on the $M_w/M_n$ of the second ethylene interpolymer may be about 2.4 and in still other cases about 2.6.

The second ethylene interpolymer contains catalyst residues that reflect the chemical composition of heterogeneous catalyst formulation. Those skilled in the art with understand that heterogeneous catalyst residues are typically quantified by the parts per million of metal in the second ethylene interpolymer, where the metal refers to the metal originating from component (vii), i.e. the "metal compound"; hereinafter this metal will be referred to as "metal B". As recited earlier in this disclosure, non-limiting examples of metal B include metals selected from Group 4 through Group 8 of the Periodic Table, or mixtures of metals selected from Group 4 through Group 8. The upper limit on the ppm of metal B in the second ethylene interpolymer may be about 12 ppm, in other cases about 10 ppm and in still other cases about 8 ppm. The lower limit on the ppm of metal B in the second ethylene interpolymer may be about 0.5 ppm, in other cases about 1 ppm and in still other cases about 3 ppm. While not wishing to be bound by any particular theory, in series mode of operation it is believed that the chemical environment within the second reactor deactivates the single site catalyst formulation, or; in parallel mode of operation the chemical environment within R2 deactivates the single site catalyst formation.

The amount of hydrogen added to R2 can vary over a wide range which allows the continuous solution process to produce second ethylene interpolymers that differ greatly in melt index, hereinafter $I_2^2$. The quantity of hydrogen added is expressed as the parts-per-million (ppm) of hydrogen in R2 relative to the total mass in reactor R2; hereinafter $H_2R^2$ (ppm). The upper limit on $I_2^2$ may be about 1000 dg/min; in some cases about 750 dg/min; in other cases about 500 dg/min, and; in still other cases about 200 dg/min. The lower limit on $I_2^2$ may be about 0.3 dg/min, in some cases about 0.4 dg/min, in other cases about 0.5 dg/min, and; in still other cases about 0.6 dg/min.

The upper limit on the weight percent (wt %) of the second ethylene interpolymer in the ethylene interpolymer product may be about 85 wt %, in other cases about 80 wt % and in still other cases about 70 wt %. The lower limit on the wt % of the second ethylene interpolymer in the ethylene interpolymer product may be about 30 wt %; in other cases about 40 wt % and in still other cases about 50 wt %.

Third Ethylene Interpolymer

A third ethylene interpolymer is not produced in R3 if a catalyst deactivator is added upstream of R3. If a catalyst deactivator is not added and optional α-olefin is not present then the third ethylene interpolymer produced in R3 is an ethylene homopolymer. If a catalyst deactivator is not added and optional α-olefin is present in R3, the following weight ratio determines the density of the third ethylene interpolymer: $((\alpha\text{-olefin})/(\text{ethylene}))^{R3}$. In the continuous solution polymerization process $((\alpha\text{-olefin})/(\text{ethylene}))^{R3}$ is one of the control parameter used to produce a third ethylene interpolymer with a desired density. Hereinafter, the symbol "$\sigma^3$" refers to the density of the ethylene interpolymer produced in R3. The upper limit on $\sigma^3$ may be about 0.975 g/cm$^3$; in some cases about 0.965 g/cm$^3$ and; in other cases about 0.955 g/cm$^3$. Depending on the heterogeneous catalyst formulations used, the lower limit on $\sigma^3$ may be about 0.89 g/cm$^3$, in some cases about 0.90 g/cm$^3$, and; in other cases about 0.91 g/cm$^3$. Optionally, a second heterogeneous catalyst formulation may be added to R3.

Typically, the upper limit on the $CDBI_{50}$ of the optional third ethylene interpolymer (containing an α-olefin) may be about 65%, in other cases about 60% and in still other cases about 55%. The $CDBI_{50}$ of an α-olefin containing optional third ethylene interpolymer will be lower than the $CDBI_{50}$ of the first ethylene interpolymer produced with the single-site catalyst formulation. Typically, the lower limit on the $CDBI_{50}$ of the optional third ethylene interpolymer (containing an α-olefin) may be about 35%, in other cases about 40% and in still other cases about 45%. If an α-olefin is not added to the continuous solution polymerization process the optional third ethylene interpolymer is an ethylene homopolymer. In the case of an ethylene homopolymer the upper limit on the $CDBI_{50}$ may be about 98%, in other cases about 96% and in still other cases about 95%, and; the lower limit on the $CDBI_{50}$ may be about 88%, in other cases about 89% and in still other cases about 90%. Typically, the $CDBI_{50}$ of the first ethylene interpolymer is higher than the $CDBI_{50}$ of the third ethylene interpolymer and second ethylene interpolymer.

The upper limit on the $M_w/M_n$ of the optional third ethylene interpolymer may be about 5.0, in other cases about 4.8 and in still other cases about 4.5. The lower limit on the $M_w/M_n$ of the optional third ethylene interpolymer may be about 2.2, in other cases about 2.4 and in still other cases about 2.6. The $M_w/M_n$ of the optional third ethylene interpolymer is higher than the $M_w/M_n$ of the first ethylene interpolymer. When blended together, the second and third ethylene interpolymer have a fourth $M_w/M_n$ which is not broader than the $M_w/M_n$ of the second ethylene interpolymer.

The catalyst residues in the optional third ethylene interpolymer reflect the chemical composition of the heterogeneous catalyst formulation(s) used, i.e. the first and optionally a second heterogeneous catalyst formulation. The chemical compositions of the first and second heterogeneous catalyst formulations may be the same or different; for example a first component (vii) and a second component (vii) may be used to synthesize the first and second heterogeneous catalyst formulation. As recited above, "metal B" refers to the metal that originates from the first component (vii). Hereinafter, "metal C" refers to the metal that originates from the second component (vii). Metal B and optional metal C may be the same, or different. Non-limiting examples of metal B and metal C include metals selected from Group 4 through Group 8 of the Periodic Table, or mixtures of metals selected from Group 4 through Group 8. The upper limit on the ppm of (metal B+metal C) in the optional third ethylene interpolymer may be about 12 ppm, in other cases about 10 ppm and in still other cases about 8 ppm. The lower limit on the ppm of (metal B+metal C) in the optional third ethylene interpolymer may be about 0.5 ppm, in other cases about 1 ppm and in still other cases about 3 ppm.

Optionally hydrogen may be added to R3. Adjusting the amount of hydrogen in R3, hereinafter $H_2^{R3}$ (ppm), allows the continuous solution process to produce third ethylene interpolymers that differ widely in melt index, hereinafter $I_2^3$. The upper limit on $I_2^3$ may be about 2000 dg/min; in some cases about 1500 dg/min; in other cases about 1000 dg/min, and; in still other cases about 500 dg/min. The lower limit on $I_2^3$ may be about 0.5 dg/min, in some cases about 0.6 dg/min, in other cases about 0.7 dg/min, and; in still other cases about 0.8 dg/min.

The upper limit on the weight percent (wt %) of the optional third ethylene interpolymer in the ethylene interpolymer product may be about 30 wt %, in other cases about 25 wt % and in still other cases about 20 wt %. The lower limit on the wt % of the optional third ethylene interpolymer in the ethylene interpolymer product may be 0 wt %; in other cases about 5 wt % and in still other cases about 10 wt %.

Ethylene Interpolymer Product

The upper limit on the density of the ethylene interpolymer product suitable for rotomolded articles may be about 0.955 g/cm$^3$; in some cases about 0.953 g/cm$^3$ and; in other cases about 0.950 g/cm$^3$. The lower limit on the density of the ethylene interpolymer product suitable for rotomolded articles may be about 0.930 g/cm$^3$, in some cases about 0.933 g/cm$^3$, and; in other cases about 0.935 g/cm$^3$.

The upper limit on the CDBI$_{50}$ of the ethylene interpolymer product may be about 97%, in other cases about 90% and in still other cases about 85%. An ethylene interpolymer product with a CDBI$_{50}$ of 97% may result if an α-olefin is not added to the continuous solution polymerization process; in this case, the ethylene interpolymer product is an ethylene homopolymer. The lower limit on the CDBI$_{50}$ of an ethylene interpolymer may be about 50%, in other cases about 55% and in still other cases about 60%.

The upper limit on the $M_w/M_n$ of the ethylene interpolymer product may be about 6, in other cases about 5 and in still other cases about 4. The lower limit on the $M_w/M_n$ of the ethylene interpolymer product may be 2.0, in other cases about 2.2 and in still other cases about 2.4.

The catalyst residues in the ethylene interpolymer product reflect the chemical compositions of: the single-site catalyst formulation employed in R1; the first heterogeneous catalyst formulation employed in R2, and; optionally the first or optionally the first and second heterogeneous catalyst formulation employed in R3. In this disclosure, catalyst residues were quantified by measuring the parts per million of catalytic metal in the ethylene interpolymer products. In addition, the elemental quantities (ppm) of magnesium, chlorine and aluminum were quantified. Catalytic metals originate from two or optionally three sources, specifically: 1) "metal A" that originates from component (i) that was used to form the single-site catalyst formulation; (2) "metal B" that originates from the first component (vii) that was used to form the first heterogeneous catalyst formulation, and; (3) optionally "metal C" that originates from the second component (vii) that was used to form the optional second heterogeneous catalyst formulation. Metals A, B and C may be the same or different. In this disclosure the term "total catalytic metal" is equivalent to the sum of catalytic metals A+B+C.

The upper limit on the ppm of metal A in the ethylene interpolymer product may be about 0.6 ppm, in other cases about 0.5 ppm and in still other cases about 0.4 ppm. The lower limit on the ppm of metal A in the ethylene interpolymer product may be about 0.001 ppm, in other cases about 0.01 ppm and in still other cases about 0.03 ppm. The upper limit on the ppm of (metal B+metal C) in the ethylene interpolymer product may be about 11 ppm, in other cases about 9 ppm and in still other cases about 7 ppm. The lower limit on the ppm of (metal B+metal C) in the ethylene interpolymer product may be about 0.5 ppm, in other cases about 1 ppm and in still other cases about 3 ppm.

In some embodiments, ethylene interpolymers may be produced where the catalytic metals (metal A, metal B and metal C) are the same metal; a non-limiting example would be titanium. In such embodiments, the ppm of (metal B+metal C) in the ethylene interpolymer product is calculated using equation (VII):

$$\text{ppm}^{(B+C)} = ((\text{ppm}^{(A+B+C)} - (f^A \times \text{ppm}^A))/(1-f^A)) \quad (VII)$$

where: ppm$^{(B+C)}$ is the calculated ppm of (metal B+metal C) in the ethylene interpolymer product; ppm$^{(A+B+C)}$ is the total ppm of catalyst residue in the ethylene interpolymer product as measured experimentally, i.e. (metal A ppm+metal B ppm+metal C ppm); $f^A$ represents the weight fraction of the first ethylene interpolymer in the ethylene interpolymer product, $f^A$ may vary from about 0.15 to about 0.6, and; ppm$^A$ represents the ppm of metal A in the first ethylene interpolymer. In equation (VII) ppm$^A$ is assumed to be 0.35 ppm.

Embodiments of the ethylene interpolymer products disclosed herein have lower catalyst residues relative to the polyethylene polymers described in U.S. Pat. No. 6,277,931. Higher catalyst residues in U.S. Pat. No. 6,277,931 increase the complexity of the continuous solution polymerization process; an example of increased complexity includes additional purification steps to remove catalyst residues from the polymer. In contrast, in the present disclosure, catalyst residues are not removed. In this disclosure, the upper limit on the "total catalytic metal", i.e. the total ppm of (metal A ppm+metal B ppm+optional metal C ppm) in the ethylene interpolymer product may be about 11 ppm, in other cases about 9 ppm and in still other cases about 7 ppm, and; the lower limit on the total ppm of catalyst residuals (metal A+metal B+optional metal C) in the ethylene interpolymer product may be about 0.5 ppm, in other cases about 1 ppm and in still other cases about 3 ppm.

The upper limit on melt index of the ethylene interpolymer product may be about 15 dg/min, in some cases about 14 dg/min; in other cases about 12 dg/min, and; in still other cases about 10 dg/min. The lower limit on the melt index of the ethylene interpolymer product may be about 0.5 dg/min, in some cases about 0.6 dg/min; in other cases about 0.7 dg/min, and; in still other cases about 0.8 dg/min.

Ethylene Interpolymer Products Having Improved ESCR

Embodiments of ethylene interpolymer products having improved ESCR were produced in a continuous solution polymerization pilot plant. The solution process conditions required to manufacture four embodiments, Examples 301-304, are disclosed in Tables 1A through 1C. Comparative Examples 78 and 79 are also disclosed in Tables 1A through 1C. Examples 301-304 and Comparative Examples 78-79 were rotomolding resins having a target melt index from about 4.5 to about 6.0 I$_2$ and a target density from about 0.935 to about 0.942 g/cm$^3$. Both the Examples and Comparative Examples were produced using a single site catalyst formulation in reactor 1 and an in-line Ziegler-Natta catalyst formulation in reactor 2. In both Examples 301-304 and Comparative Examples 78-79, reactors 1 and 2 were configured in series, i.e. the effluent from reactor 1 flowed directly into reactor 2.

The physical properties of Examples 301-304 and Comparative Examples 76-79 are disclosed in Table 2. Comparative Examples 76 and 77 were pilot plant samples produced using essentially the same process conditions as those disclosed in Tables 1A-1C for Comparative Examples 78 and 79.

As shown in Table 2, the ethylene interpolymer products of this disclosure are further characterized by a terminal vinyl unsaturation greater than or equal to 0.03 terminal vinyl groups per 100 carbon atoms (≥0.03 terminal vinyls/100 C) as determined by Fourier Transform Infrared (FTIR) spectroscopy according to ASTM ASTM D3124-98 and ASTM D6248-98. The ethylene interpolymer products of this disclosure have higher terminal vinyl unsaturation relative to Comparative E which had an average terminal vinyl unsaturations of 0.0215±0.003 vinyl groups per 100 carbons atoms (multiple samples of Comparative E), as shown in Table 7. Comparative E was an ethylene interpolymer product comprising a first ethylene interpolymer synthesized using a single-site catalyst formation and a second ethylene interpolymer synthesized using a batch Ziegler-Natta catalyst formulation employing a dual reactor solution process, i.e. Elite® 5400G, an ethylene/1-octene interpolymer available from The Dow Chemical Company (Midland, Mich., USA).

As shown in Table 2, the ethylene interpolymer products of this disclosure are further characterized by having ≥3 parts per million (ppm) of total catalytic metal, where the catalytic metal was Ti. Catalytic metal was determined by Neutron Activation Analysis (N.A.A.) as specified herein. The total catalytic metal in the ethylene interpolymer products of this disclosure was higher relative to Comparative E which had a total catalytic metal content of 1.25±0.07 ppm Ti as shown in Table 7.

Figure 5:
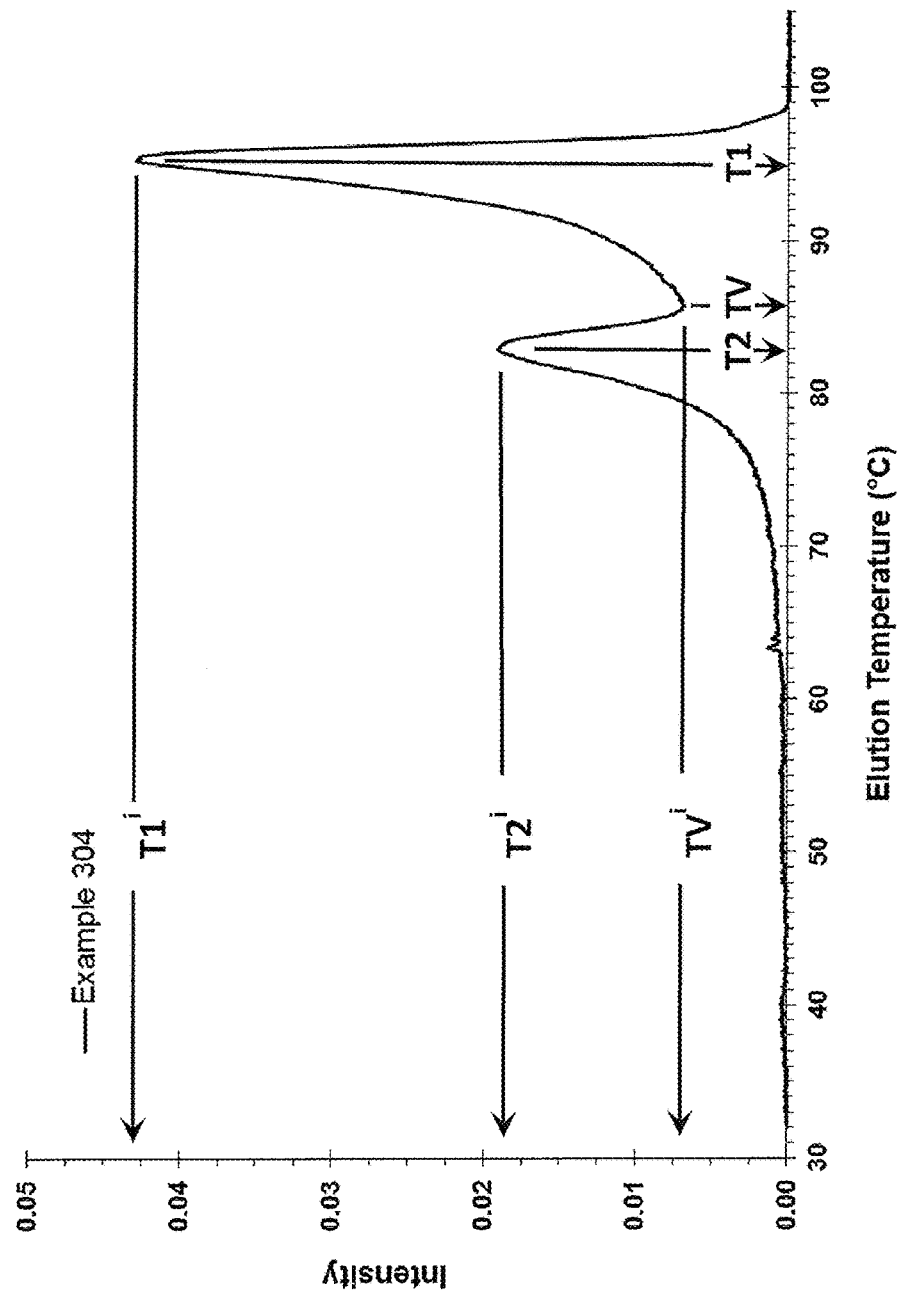
FIG. 5: Temperature Rising Elution Fractionation (TREF) curve of Example 304 and the definition of (T1, T1$^i$), (T2, T2$^i$) and (TV and TV$^i$).
Figure 6:
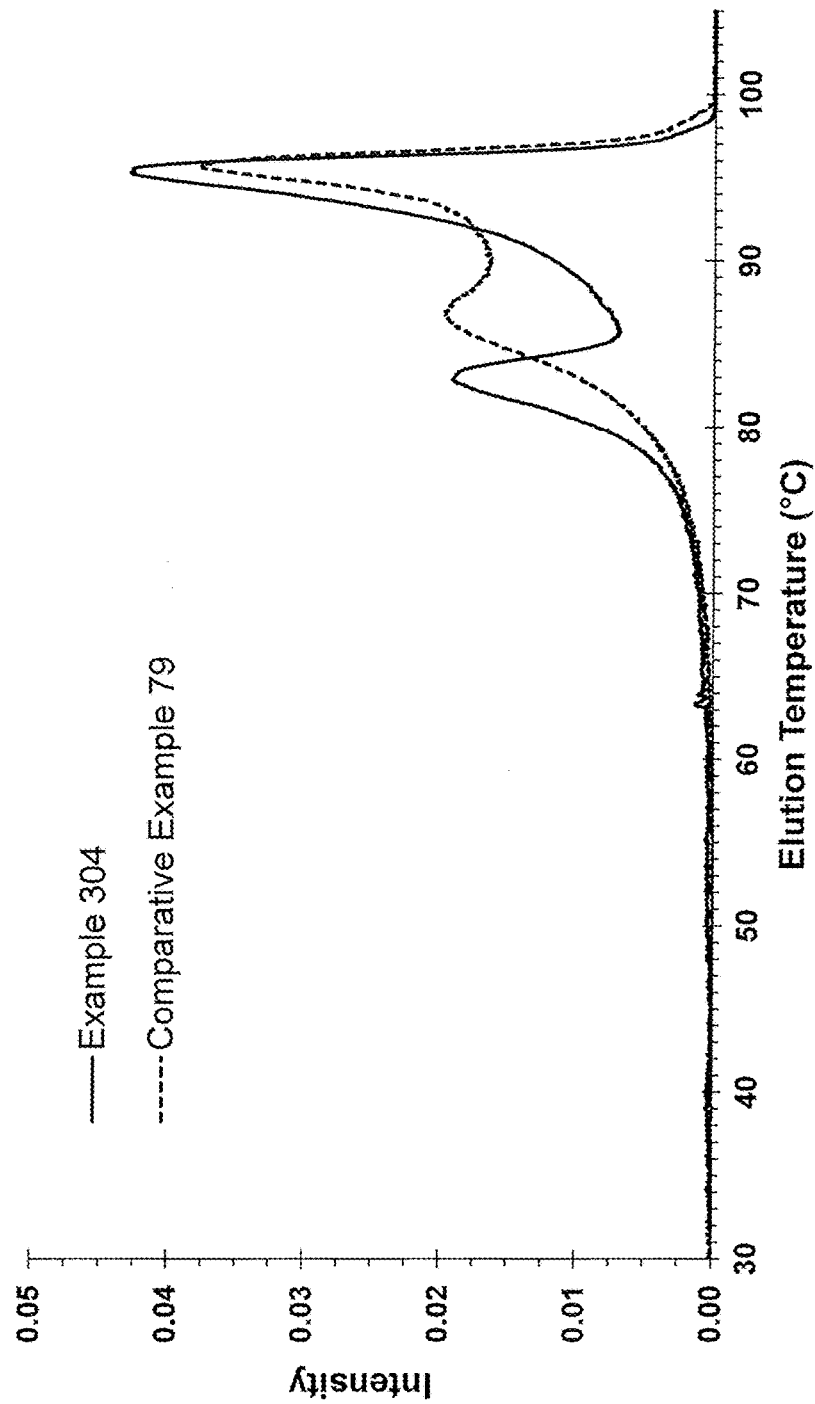
FIG. 6: Comparison of the Temperature Rising Elution Fractionation (TREF) curves of Example 304 and Comparative Example 79.

Temperature Rising Elution Fractionation (TREF) data of Examples 301-304 and Comparative Examples 76-79 are disclosed in Table 3. FIG. 5 illustrates the TREF curve of Example 304 and clearly defines the following parameters: T1 and T1$^i$ are the TREF temperature and TREF intensity, respectively, of the TREF peak that eluted at the highest temperature, e.g. 95.3° C. (Example 304); T2 and T2$^i$ are the TREF temperature and TREF intensity, respectively, of the TREF peak that eluted at the lowest temperature, e.g. 82.9° C. (Example 304); TV and TV$^i$ are the TREF temperature and TREF intensity, respectively, of the valley in the TREF curve between T1 and T2. FIG. 6 compares the TREF curves of Example 304 and Comparative Example 79. As shown in Table 3 the weight fraction of interpolymer that eluted at TREF elution temperatures less than or equal to 85° C. (wtF$^{≤85}$) was higher in Examples 301-304 relative to Comparative Examples 76-79 (wtF$_c^{≤85}$, wherein the subscript 'c' represents the Comparative). To be more clear, as shown in Table 3 and FIG. 6, wtF$^{≤85}$ was 0.342 for Example 304; expressed alternatively, 34.2 weight percent of the interpolymer eluted at TREF temperatures ≤85° C. and the remaining portion 65.8 weight percent eluted at TREF temperatures above 85° C. In contrast, as shown in Table 3 and FIG. 6, wtF$_c^{≤85}$ was 0.221 for Comparative Example 79. Expressed alternatively, Example 304's wtF$^{≤85}$ was 54.8% higher relative to Comparative Example 79's wtF$_c^{≤85}$, i.e. 54.8%=100%(wtF$^{≤85}$−wtF$_c^{≤85}$)/(wtF$_c^{≤85}$)=100(0.342−0.221)/0.221. Given the disclosures in Table 3, wtF$^{≤85}$ was from 12.9% to 134% higher, relative to comparative wtF$_c^{≤85}$. As shown in Table 3 the TREF (T1−T2) temperature difference was higher in Examples 301-304 relative to Comparative Examples 76-79. More specifically, as shown in Table 3 and FIG. 6, (T1−T2) was 12.4° C. for Example 304. In contrast, (T1−T2) was 8.7° C. for Comparative Example 79. Example 304's (T1−T2) was 42.5% higher relative to Comparative Example 79's (T1−T2), i.e. 42.5%=100(12.4° C.−8.7° C.)/8.7° C. Given the disclosures in Table 3, (T1−T2) of the Examples was from 5% to 63% higher, relative to (T1−T2) of the Comparative Examples.

Figure 7:
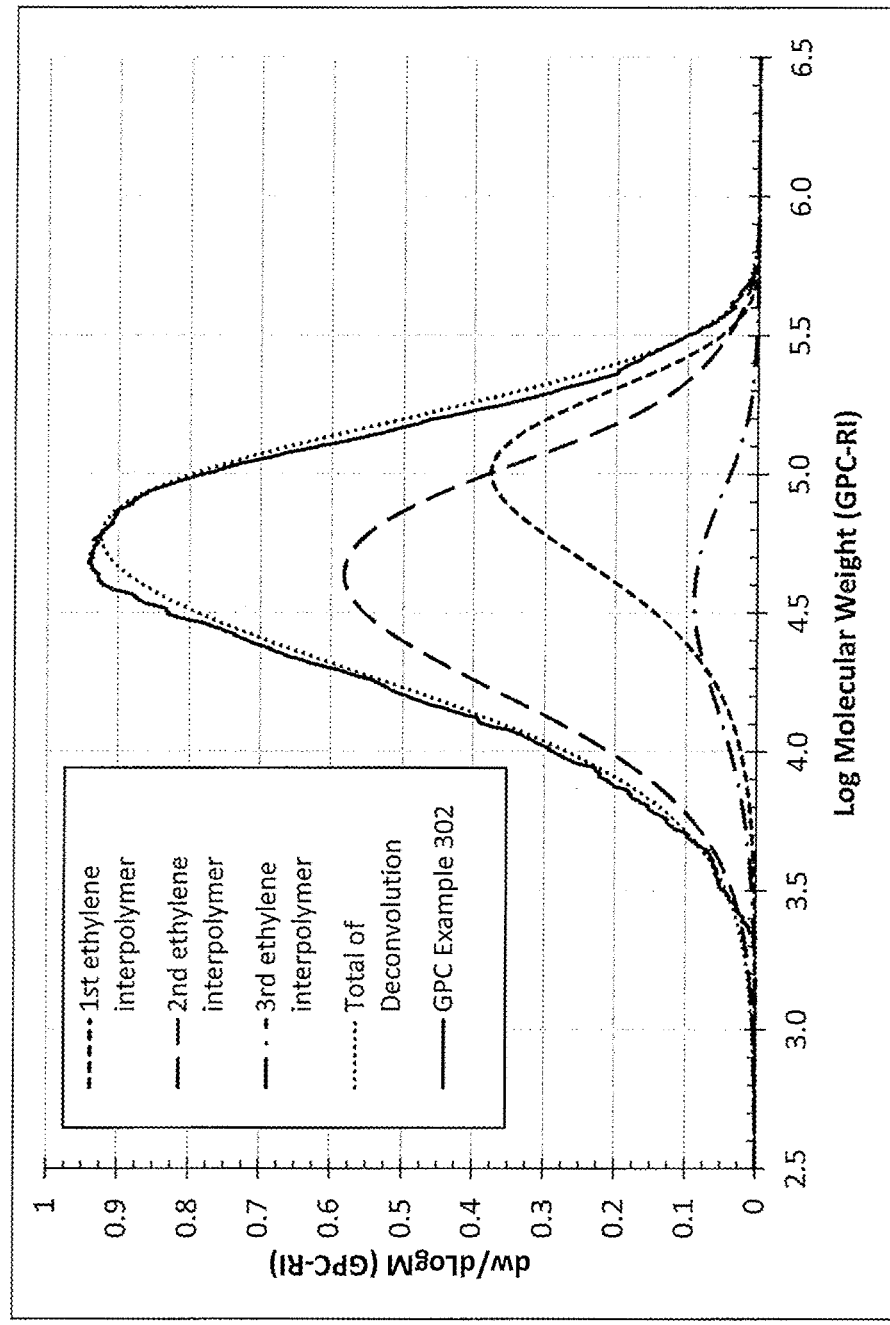
FIG. 7: Deconvolution of Example 302's GPC chromatogram into a first ethylene interpolymer, a second ethylene interpolymer and a third ethylene interpolymer.
Figure 8:
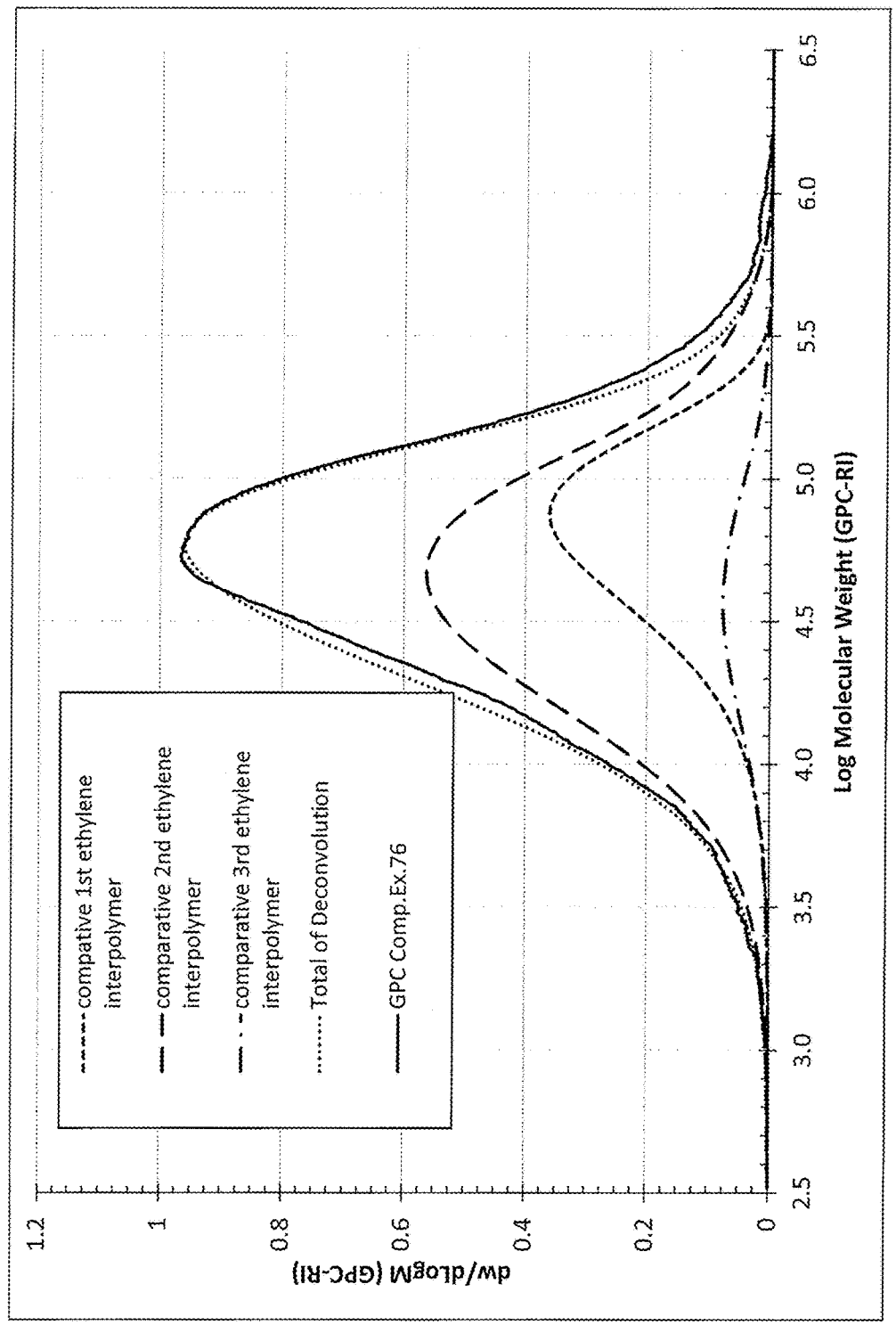
FIG. 8: Deconvolution of Comparative Example 76's GPC chromatogram into a comparative first ethylene interpolymer, a comparative second ethylene interpolymer and a comparative third ethylene interpolymer.

Table 4 documents GPC deconvolution results for Examples 301-304 and Comparative Examples 76-79. GPC deconvolution was a kinetic modelling and curve-fitting algorithm that resolved a GPC chromatogram into three ethylene interpolymer components based on kinetic modelling, where the model included kinetic constants specific for each catalyst formulation, polymerization conditions (e.g. temperatures and feeds) and reactor configuration. For example, as shown in FIG. 7, the GPC chromatogram of Example 302 was deconvoluted into a first ethylene interpolymer, a second ethylene interpolymer and a third ethylene interpolymer. Similarly, as shown in FIG. 8, the GPC chromatogram of Comparative Example 76 was deconvoluted into a comparative first ethylene interpolymer, a comparative second ethylene interpolymer and a comparative third ethylene interpolymer. In Table 4, the term "1$^{st}$ M$_n$ (g/mol)" represents the deconvoluted number average molecular weight of the first ethylene interpolymer in the ethylene interpolymer product (Ex. 301-304) or the comparative first ethylene interpolymer in the comparative ethylene interpolymer product (Comp. Ex. 76-79), in this disclosure the subscript 'c', where c refers to comparative examples, was used to identify the latter, i.e. 1$^{st}$ (M$_n$)$_c$. Similarly, in Table 4, the term "1$^{st}$ M$_w$ (g/mol)" represents the deconvoluted weight average molecular weight of the first ethylene interpolymer (1$^{st}$ M$_w$) in the ethylene interpolymer product (Ex. 301-304) or the comparative first ethylene interpolymer (1$^{st}$ (M$_w$)$_c$) in the comparative ethylene interpolymer product (Comp. Ex. 76-79), again the subscript 'c' refers to the comparative examples. In the deconvolution algorithm the first ethylene interpolymer and comparative first ethylene interpolymer were fit to a Flory distribution having M$_w$/M$_n$ and (M$_w$/M$_n$)$_c$ values of 2.0, these components were produced using a single site catalyst formulation. The remaining components were all produced using an in-line Ziegler-Natta catalyst formulation and the molecular weight distribution of these components were deconvoluted using a multi-site Ziegler-Natta kinetic model. In the case of Examples 301-304, Table 4 discloses that these four Examples contained a first ethylene interpolymer having an average 1$^{st}$ M$_w$ of 105821 g/mol. In contrast the four Comparative Examples 76-79 contained a comparative first ethylene interpolymer having an average (1$^{st}$ M$_w$)$_c$ of 67424 g/mol. Further, comparing the first and the comparative first ethylene interpolymers it was evident that the 1$^{st}$ M$_w$ of the first ethylene interpolymer was from about 25% to about 123% higher relative to 1$^{st}$ (M$_w$)$_c$ of the comparative first ethylene interpolymer, i.e.: 25%=100*((1$^{st}$ M$_w^{Ex.301}$−1$^{st}$ (M$_w$)$_c^{Comp.Ex.76}$)/(1$^{st}$(M$_w$)$_c^{Comp.Ex.76}$)) and 123%=100*((1$^{st}$ M$_w^{Ex.304}$−1$^{st}$ (M$_w$)$_c^{Comp.Ex.79}$)/(1$^{st}$ (M$_w$)$_c^{Comp.Ex.79}$)). Table 4 discloses a first M$_w$/M$_n$, a second M$_w$/M$_n$ and a third M$_w$/M$_n$ of the first, second and third ethylene interpolymer, respectively. The first M$_w$/M$_n$ was lower relative to the second and third M$_w$/M$_n$. Table 4 also discloses a fourth (4$^{th}$) M$_w$/M$_n$, which was the polydispersity of a blend containing the second and third ethylene interpolymers. As shown in Table 4, the fourth M$_w$/M$_n$ of the blend was not larger than the second M$_w$/M$_n$ of the second ethylene interpolymer.

In this disclosure, compression molded plaque ESCR data was used as a proxy for the ESCR performance of the wall structure of a rotomolded part. Further, ESCR testing was employed as a pass/fail test. Specifically, the wall structure of a rotomolded part passed ESCR test Condition A100 if the failure time ($F^A_{50}$) was ≥1000 hr, where $F^A_{50}$ was estimated graphically as described in Annex A1 of ASTM D1693; in contrast, the wall structure of a rotomolded part failed ESCR text Condition A100 if $F^A_{50}$ was <1000 hr. Similarly, the wall structure of a rotomolded part passed ESCR test Condition B100 if the failure time ($F^B_{50}$) was ≥1000 hr, where $F^B_{50}$ was estimated graphically as described in Annex A1 of ASTM D1693; in contrast, the wall structure failed the ESCR text Condition B100 if $F^B_{50}$ was <1000 hr.

Table 5 discloses the 1% flex secant modulus and Environmental Stress Crack Resistance (ESCR) of Examples 301-304 and Comparative Examples 76-79, it is evident that the former have improved ESCR relative to the latter. Both ESCR Condition A and B were performed using 100% Igepal Co-630. To be clear, in the case of Examples 301-304 none of the ESCR test specimens (10-specimens for each Example) failed after 1000 hr of ESCR testing (in both ESCR Condition A100 and the ESCR B100) and the ESCR test was terminated after 1000 hr (41.7 day). In contrast, 50% of the failures occurred at 67 hr (2.9 day) using ESCR Condition A100 for Comparative Example 77, and at 847 hr (35.3 day) using ESCR Condition B100 for Comparative Example 76.

Figure 2:
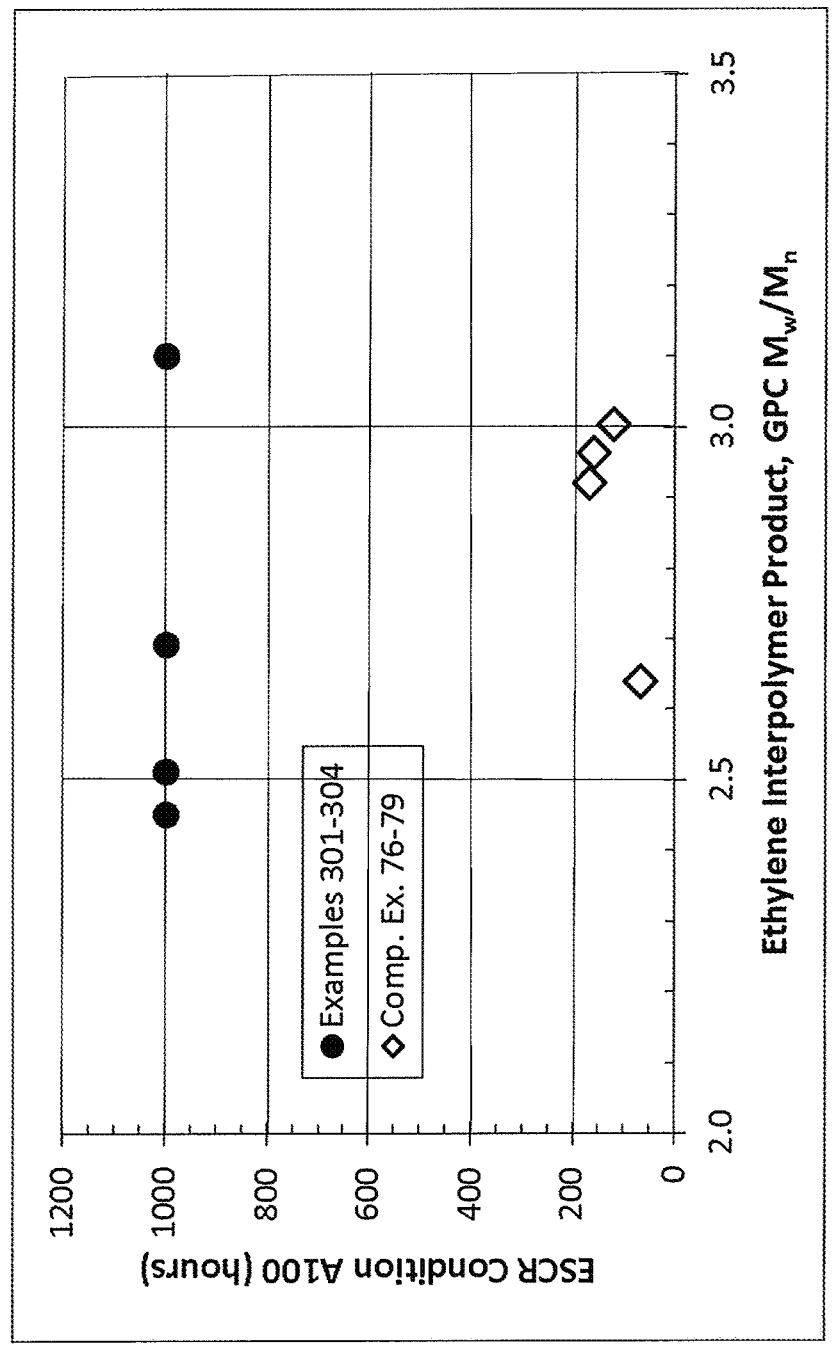
FIG. 2: Environmental Stress Crack Resistance (ESCR) Condition A100 versus GPC determined polydispersity ($M_w/M_n$) of ethylene interpolymer product Examples 301-304 and Comparative Examples 76-79.
Figure 3:
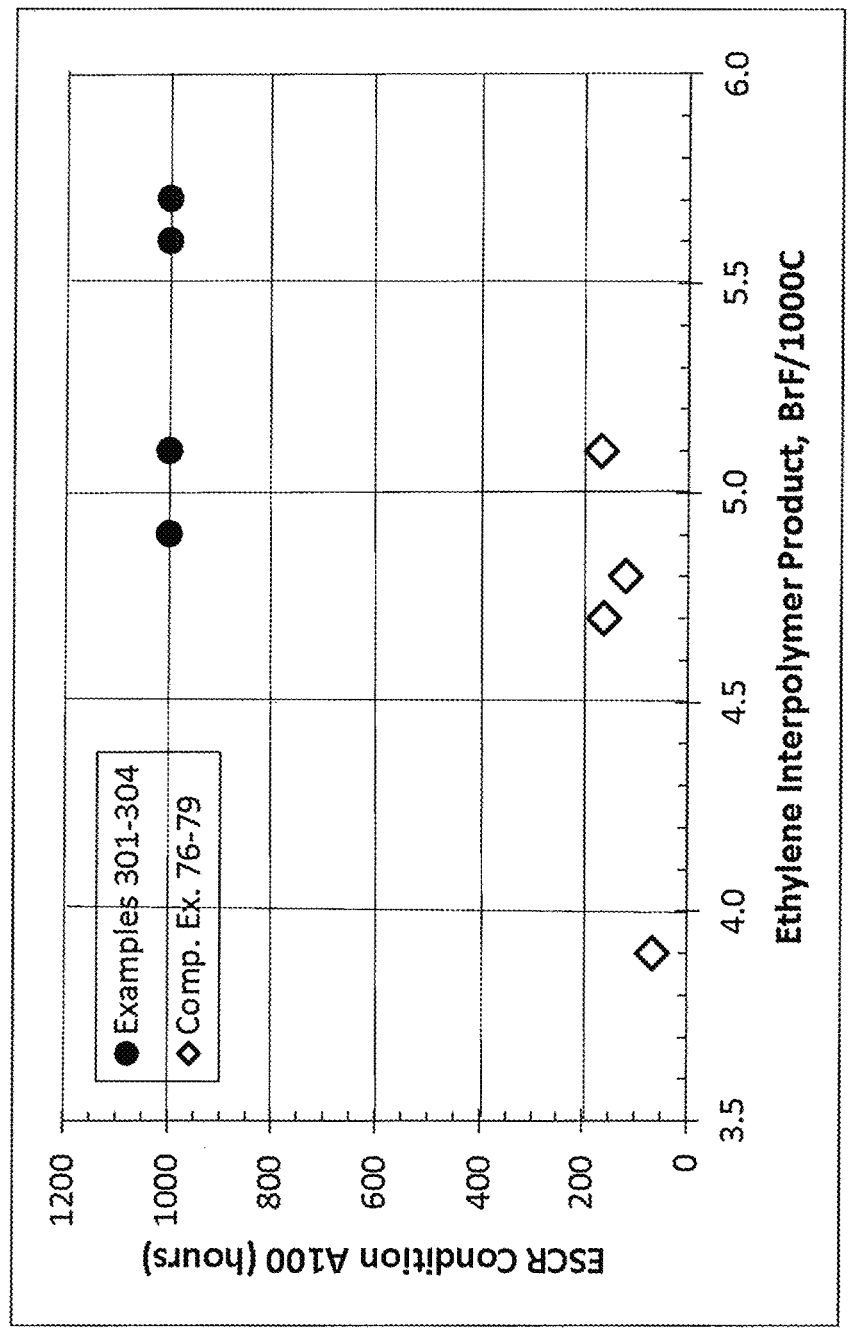
FIG. 3: Environmental Stress Crack Resistance (ESCR) Condition A100 versus FTIR determined branching (BrF/1000C) of ethylene interpolymer product Examples 301-304 and Comparative Examples 76-79.
Figure 4:
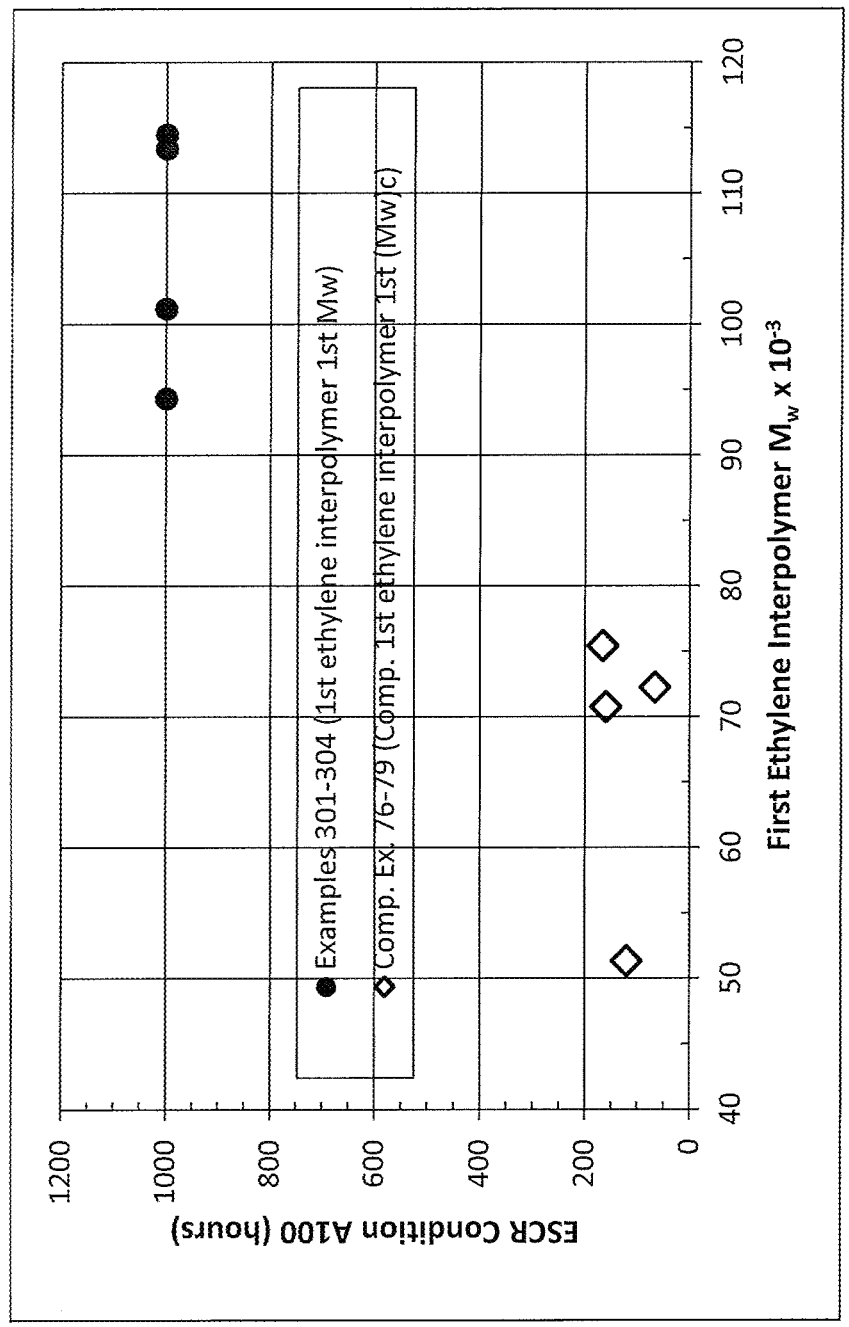
FIG. 4: Environmental Stress Crack Resistance (ESCR) Condition A100 versus the weight average molecular weight of the deconvoluted first ethylene interpolymer, $1^{st}\ M_w$, in Examples 301-304 relative to the weight average molecular weight of the deconvoluted comparative first ethylene interpolymer $1^{st}\ (M_w)_C$ in Comparative Examples 76-79.

FIG. 1 shows Examples 301-304 have improved ESCR (Condition A100) even though the average GPC $M_w$ of Examples 301-304 was lower, i.e. 68832 g/mol, relative to the GPC $(M_w)_c$ of Comparative Examples 76-79, i.e. 75326 g/mol (these two averages $M_w$ and $(M_w)_c$ were significantly different based on a two-sample t-Test assuming equal variances). This was a surprising result, i.e. Examples 301-304 having lower GPC $M_w$ and improved ESCR, relative to Comparative Examples 76-79 having higher GPC $(M_w)_c$ and inferior ESCR. FIG. 2 illustrates the improved ESCR of Examples 301-304 relative to Comparatives 76-79 even though there was no significant difference in the GPC determined polydispersities ($M_w/M_n$ or $(M_w/M_n)_c$). FIG. 3 plots the improved ESCR of Examples 301-304, relative to Comparatives 76-79, versus the GPC-FTIR determined branch content (BrF/1000C). FIG. 4 plots the ESCR of Examples 301-304 and Comparative Examples 76-79 as a function of the deconvoluted weight average molecular weight of the first ethylene interpolymer and comparative first ethylene interpolymer. FIG. 4 clearly shows the improved ESCR performance of Examples 301-304, relative to Comparative Examples 76-79.

Table 6 discloses the ARM Impact performance of rotomolded parts manufactured from Examples 301-304 and Comparative Examples 76-79. In the ARM Impact test, a rotomolded part having an ARM Mean Failure Energy ≥120 lb·ft in combination with an ARM Ductility equal to or greater than or equal to 50% was considered a good part, i.e. the part passed the ARM Impact test. Prior to fabricating rotomolded articles, Examples and Comparative Examples were passed through a twin screw extruder where 1500 ppm of a UV (ultra violet) protective additive (Tinuvin 622, available from BASF Corporation, Florham Park, N.J., U.S.A) was thoroughly blended into the ethylene interpolymer product. The rotomolded parts manufactured were cubical in shape (12.5 inches (31.8 cm)×12.5 inches×12.5 inches) having a wall thickness of 0.25 inches (0.64 cm). The low temperature impact properties of test specimens cut from rotomolded parts were evaluated using the ARM impact test performed in accordance with ASTM D5628 at a test temperature of −40° C. This test was adapted from the Association of Rotational Molders International, Low Temperature Impact Test, Version 4.0 dated July 2003; herein incorporated by reference.

Dilution Index ($Y_d$) of Ethylene Interpolymer Products

Figure 9:
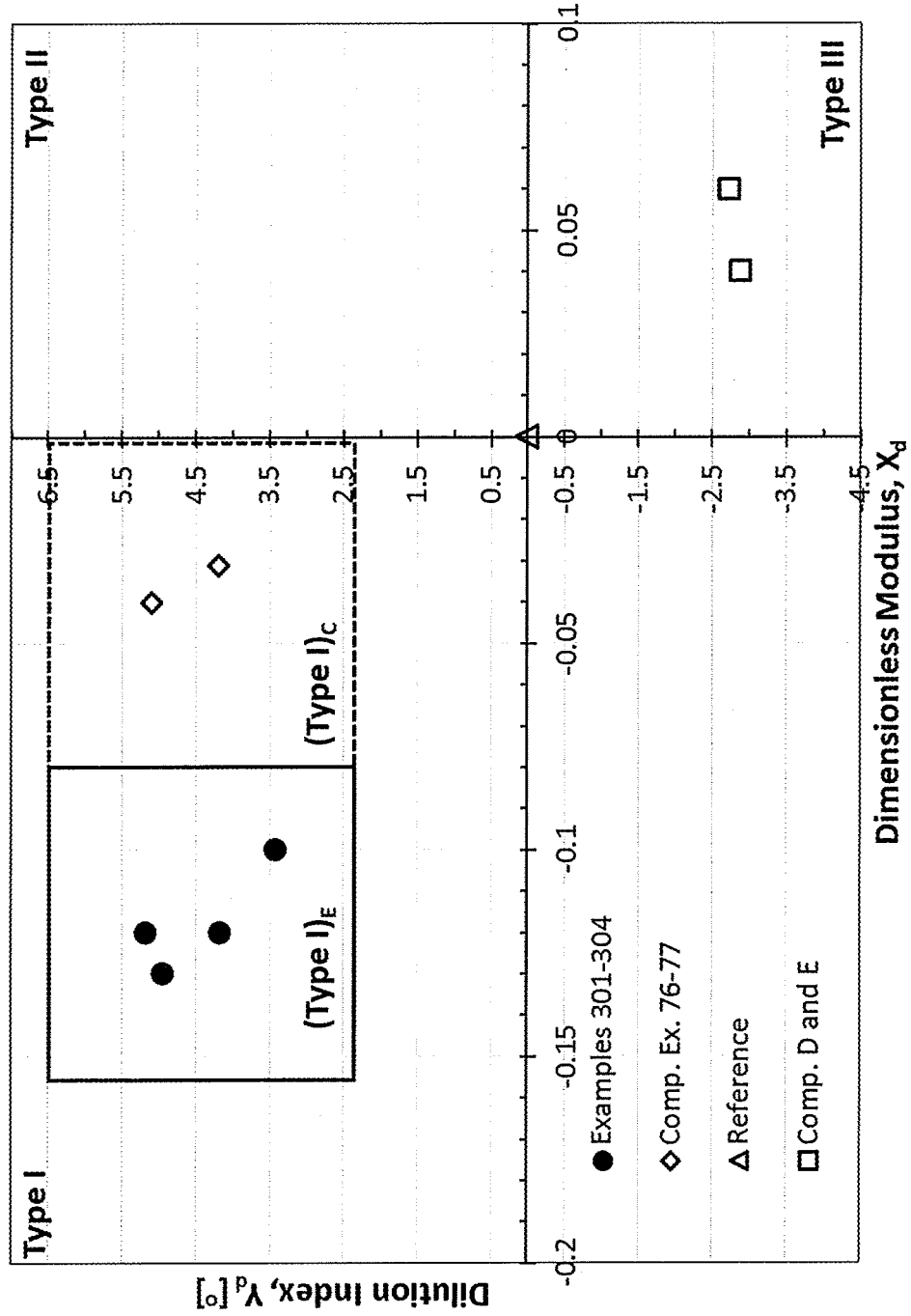
FIG. 9: The Dilution Index, $Y_d$, as a function of the Dimensionless Modulus, $X_d$, for Examples 301-304, Comparative Examples 76-77, Comparatives D and E and Comparative S, the latter was the rheological Reference.

Table 7 discloses rheological characteristics of Examples 301-304, Comparative Examples 76 and 77 and Comparatives D and E, i.e. the zero shear viscosity, $\eta_0$, Dilution Index, $Y_d$, and the Dimensionless Modulus, $X_d$. In FIG. 9 the Dilution Index ($Y_d$, having dimensions of ° (degrees)) and Dimensionless Modulus ($X_d$) are plotted. Further, FIG. 9 defines the following three quadrants:

Type I: $Y_d>0$ and $X_d<0$;
Type II: $Y_d>0$ and $X_d>0$, and;
Type III: $Y_d<0$ and $X_d>0$.

In FIG. 9, Comparative S (open triangle) was used as the rheological reference in the Dilution Index test protocol. Comparative S was an ethylene interpolymer product comprising an ethylene interpolymer synthesized using an in-line Ziegler-Natta catalyst in one solution reactor, i.e. SCLAIR® FP120-C which was an ethylene/1-octene interpolymer available from NOVA Chemicals Company (Calgary, Alberta, Canada). Comparatives D and E (open square, $Y_d<0$, $X_d>0$) were ethylene interpolymer products comprising a first ethylene interpolymer synthesized using a single-site catalyst formation and a second ethylene interpolymer synthesized using a batch Ziegler-Natta catalyst formulation employing a dual reactor solution process, i.e. Elite® 5100G and Elite® 5400G, respectively, both ethylene/1-octene interpolymers available from The Dow Chemical Company (Midland, Mich., USA).

The following paragraphs defines the Dilution Index ($Y_d$) and Dimensionless Modulus ($X_d$). In addition to having molecular weights, molecular weight distributions and branching structures, blends of ethylene interpolymers may exhibit a hierarchical structure in the melt phase. In other words, the ethylene interpolymer components may be, or may not be, homogeneous down to the molecular level depending on interpolymer miscibility and the physical history of the blend. Such hierarchical physical structure in the melt is expected to have a strong impact on flow and hence on processing and converting; as well as the end-use properties of manufactured articles. The nature of this hierarchical physical structure between interpolymers can be characterized.

Figure 10:
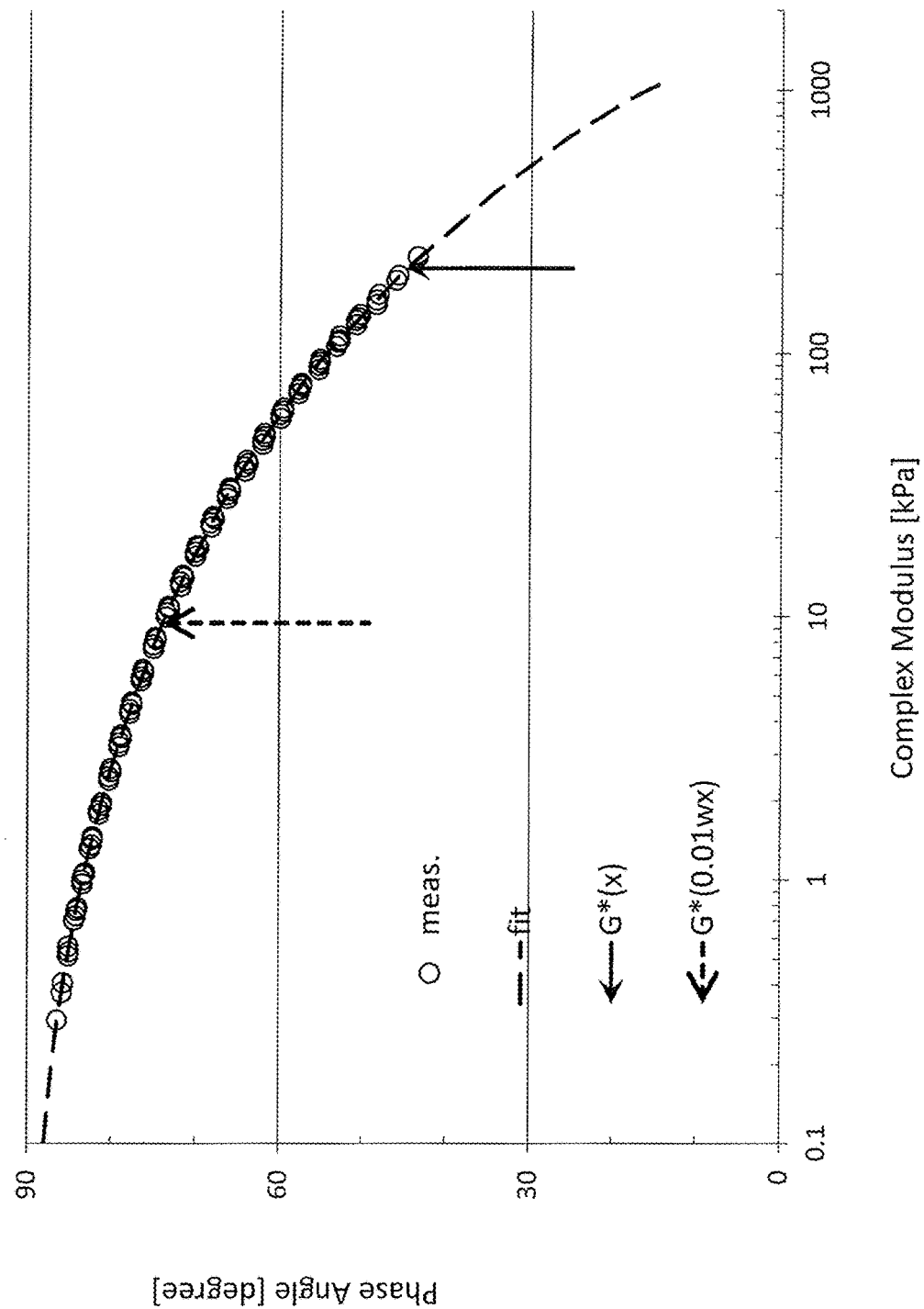
FIG. 10: A typical Van Gurp Palmen (VGP) plot of phase angle [°] versus complex modulus [kPa].

The hierarchical physical structure of ethylene interpolymers can be characterized using melt rheology. A convenient method can be based on the small amplitude frequency sweep tests. Such rheology results are expressed as the phase angle δ as a function of complex modulus G*, referred to as van Gurp-Palmen plots (as described in M. Van Gurp, J. Palmen, Rheol. Bull. (1998) 67(1): 5-8, and; Dealy J, Plazek D. Rheol. Bull. (2009) 78(2): 16-31). For a typical ethylene interpolymer, the phase angle δ increases toward its upper bound of 90° with G* becoming sufficiently low. A typical VGP plot is shown in FIG. 10. The VGP plots are a signature of resin architecture. The rise of δ toward 90° is monotonic for an ideally linear, monodisperse interpolymer. The δ(G*) for a branched interpolymer or a blend containing a branched interpolymer may show an inflection point that reflects the topology of the branched interpolymer (see S. Trinkle, P. Walter, C. Friedrich, Rheo. Acta (2002) 41: 103-113). The deviation of the phase angle δ from the monotonic rise may indicate a deviation from the ideal linear interpolymer either due to presence of long chain branching if the inflection point is low (e.g., δ≤20°) or a blend containing at least two interpolymers having dissimilar branching structure if the inflection point is high (e.g., δ≥70°).

Figure 11:
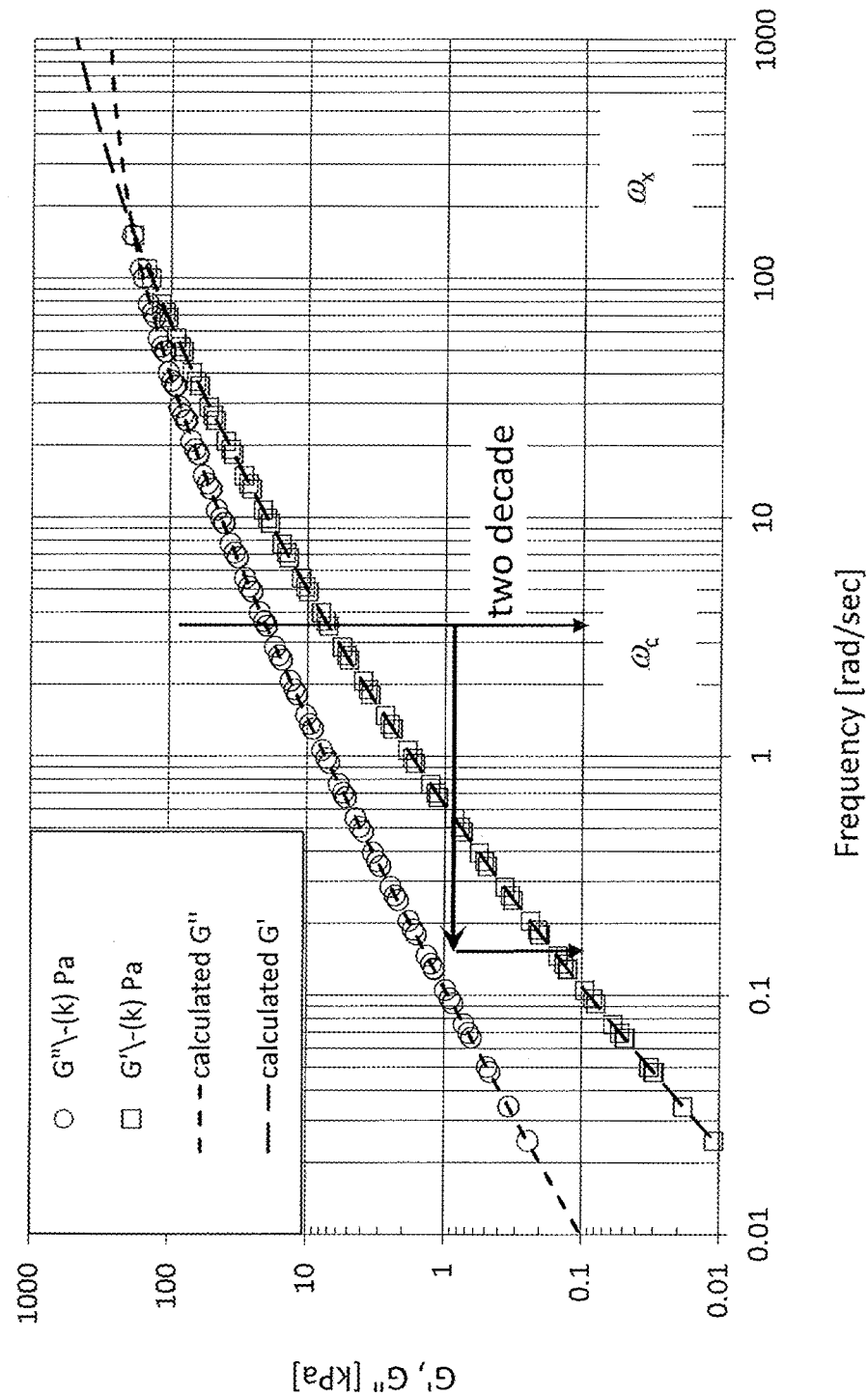
FIG. 11: A typical storage (G') and loss modulus (G") plot showing the cross over frequency $\omega_x$ and the two decade shift in phase angle to reach $\omega_c$ ($\omega_c$=0.01 $\omega_x$).

For commercially available linear low density polyethylenes, inflection points are typically not observed; with the exception of some commercial polyethylenes that contain a small amount of long chain branching (LCB). To use the VGP plots regardless of presence of LCB, an alternative is to use the point where the frequency $\omega_c$ is two decades below the cross-over frequency $\omega_x$, i.e., $\omega_c = 0.01\omega_x$. The cross-over point is taken as the reference as it is known to be a characteristic point that correlates with MI, density and other specifications of an ethylene interpolymer. The cross-over modulus is related to the plateau modulus for a given molecular weight distribution (see S. Wu. J Polym Sci, Polym Phys Ed (1989) 27:723; M. R. Nobile, F. Cocchini. Rheol Acta (2001) 40:111). The two decade shift in phase angle δ is to find the comparable points where the individual viscoelastic responses of constituents could be detected; to be more clear, this two decade shift is shown in FIG. 11. The complex modulus $G_c^*$ for this point is normalized to the cross-over modulus, $G_x^*/(\sqrt{2})$, as $(\sqrt{2})G_c^*/G_x^*$, to minimize the variation due to overall molecular weight, molecular weight distribution and the short chain branching. As a result, the coordinates on VGP plots for this low frequency point at $\omega_c = 0.01\omega_x$, namely $(\sqrt{2})G_c^*/G_x^*$ and $\delta_c$, characterize the contribution due to blending. Similar to the inflection points, the closer the $((\sqrt{2})G_c^*/G_x^*, \delta_c)$ point is toward the 90° upper bound, the more the blend behaves as if it were an ideal single component.

As an alternative way to avoid interference due to the molecular weight, molecular weight distribution and the short branching of the ethylene 8, interpolymer ingredients, the coordinates $(G_c^*, \delta_c)$ are compared to a reference sample of interest (i.e. Comparative S) to form the following two parameters:

"Dilution Index ($Y_d$)"

$$Y_d = \delta_c - (C_0 - C_1 e^{C_2 \ln G^*c})$$

"Dimensionless Modulus ($X_d$)"

$$X_d = \text{Log}(G_{0.01\omega_c}^*/G_r^*)$$

The constants $C_0$, $C_1$, and $C_2$ are determined by fitting the VGP data δ(G*) of the reference sample to the following equation:

$$\delta = C_0 - C_1 e^{C_2 \ln G^*}$$

$G_r^*$ is the complex modulus of this reference sample at its $\delta_c = \delta(0.01\omega_x)$. When an ethylene interpolymer, synthesized with an in-line Ziegler-Natta catalyst employing one solution reactor, having a density of 0.920 g/cm³ and a melt index (MI or $I_2$) of 1.0 dg/min is taken as a reference sample, the constants are:

$C_0 = 93.43°$
$C_1 = 1.316°$
$C_2 = 0.2945$
$G_r^* = 9432$ Pa.

The values of these constants can be different if the rheology test protocol differs from that specified herein.

These regrouped coordinates $(X_d, Y_d)$ from $(G_c^*, \delta_c)$ allows comparison between ethylene interpolymer products disclosed herein and Comparative examples. As shown in FIG. 9, the $X_d$ values of Examples 301-304 and Comparative Examples 76-77 are different (the means were significantly different based on a two-sample t-Test assuming equal variance). The upper left quadrant (Type I) of FIG. 9 was further divided into a (Type I)$_E$ region and a (Type I)$_C$ region, where the subscripts 'E' and 'C' represent Examples and Comparatives, respectively: for Examples 301-301 the $(X_d)_E$ values range from about −0.16 to about ≤−0.08 (dimensionless), and; for Comparative Examples 76-77 the $(X_d)_C$ valued range from greater than −0.08 to about 0.0 (dimensionless). For both Examples and Comparatives, the $Y_d$ values ranged from about 2.4 to about 2.6 degrees [°]. Type III (lower right quadrant) comparative ethylene interpolymers Comparative D and E had $Y_d<0$ and $X_d>0$.

The ethylene interpolymer products of this disclosure fall into the quadrant Type I ($Y_d>0$, $X_d<0$). Further, the ethylene interpolymer products of this disclosure have a Dimensionless Modulus $(X_d)_E$ that ranges from about −0.16 to about −0.08 (dimensionless) as shown by the (Type I)$_E$ region shown in FIG. 9.

In the Dilution Index testing protocol, the upper limit on $Y_d$ may be about 20, in some cases about 15 and is other cases about 13. The lower limit on $Y_d$ may be about −30, in some cases −25, in other cases −20 and in still other cases −15. In the Dilution Index testing protocol, the upper limit on $X_d$ is 1.0, in some cases about 0.95 and in other cases about 0.9. The lower limit on $X_d$ is −2, in some cases −1.5 and in still other cases −1.0.

Rigid Manufactured Articles

There is a need to improve the Environmental Stress Crack Resistance (ESCR) rotomolding articles, while maintaining or increasing stiffness and retaining impact properties. The ethylene interpolymer products disclosed are well suited to deliver this challenging combination of properties.

Additional non-limiting applications where the disclosed ethylene interpolymer may be used include: deli containers, margarine tubs, trays, cups, lids, bottles, bottle cap liners, pails, crates, drums, bumpers, industrial bulk containers, industrial vessels, material handling containers, playground equipment, recreational equipment, safety equipment, wire and cable applications (power cables, communication cables and conduits), tubing and hoses, pipe applications (pressure pipe and non-pressure pipe, e.g. natural gas distribution, water mains, interior plumbing, storm sewer, sanitary sewer, corrugated pipes and conduit), foamed articles (foamed sheet or bun foam), military packaging (equipment and ready meals), personal care packaging (diapers and sanitary products), cosmetic, pharmaceutical and medical packaging, truck bed liners, pallets and automotive dunnage. Such rigid manufactured articles may be fabricated using the conventional injection molding, compression molding and blow molding techniques. The desired physical properties of rigid manufactured articles depend on the application of interest. Non-limiting examples of desired properties include: flexural modulus (1% and 2% secant modulus); tensile toughness; environmental stress crack resistance (ESCR); slow crack growth resistance (PENT); abrasion resistance; shore hardness; heat deflection temperature (HDT); VICAT softening point; IZOD impact strength; ARM impact resistance; Charpy impact resistance, and; color (whiteness and/or yellowness index). Rigid manufactured articles also include rotomolded articles, examples of the ethylene interpolymer products disclosed herein are suitable to manufacture rotomolded articles having improved stiffness and similar or improved ESCR relative to comparative ethylene interpolymer products.

Additives and Adjuvants

The ethylene interpolymer products and the manufactured rotomolded articles described above may optionally include, depending on its intended use, additives and adjuvants. Non-limiting examples of additives and adjuvants include, anti-blocking agents, antioxidants, heat stabilizers, slip agents, processing aids, anti-static additives, colorants, dyes, filler materials, light stabilizers, heat stabilizers, light absorbers, lubricants, pigments, plasticizers, nucleating agents and combinations thereof.

Testing Methods

Prior to testing, each specimen was conditioned for at least 24 hours at 23±2° C. and 50±10% relative humidity and subsequent testing was conducted at 23±2° C. and 50±10% relative humidity. Herein, the term "ASTM conditions" refers to a laboratory that is maintained at 23±2° C. and 50±10% relative humidity; and specimens to be tested were conditioned for at least 24 hours in this laboratory prior to testing. ASTM refers to the American Society for Testing and Materials.

Density

Ethylene interpolymer product densities were determined using ASTM D792-13 (Nov. 1, 2013).

Melt Index

Ethylene interpolymer product melt index was determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively. Herein, the term "stress exponent" or its acronym "S.Ex.", is defined by the following relationship:

$$S.Ex.=\log(I_6/I_2)/\log(6480/2160)$$

wherein $I_6$ and $I_2$ are the melt flow rates measured at 190° C. using 6.48 kg and 2.16 kg loads, respectively. In this disclosure, melt index was expressed using the units of g/10 minutes or g/10 min or dg/minutes or dg/min; these units are equivalent.

Environmental Stress Crack Resistance (ESCR)

ESCR was determined according to ASTM D1693-13 (Nov. 1, 2013); herein incorporated by reference. Both ESCR Condition A and B were employed. In Condition A the specimen thickness was within the range of 3.00 to 3.30 mm (0.120 to 0.130 in) and the notch depth was within the range of 0.50 to 0.65 mm (0.020 to 0.025 in). Condition A was conducted using 100% Igepal CO-630 (nonylphenoxy polyoxyethylene nonylphenylether). In Condition B the specimen thickness was within the range of 1.84 to 1.97 mm (0.0725 to 0.0775 in) and a notch depth was within the range of 0.30 to 0.40 mm (0.012 to 0.015 in). Condition B experiments were conducted using 100% Igepal CO-630 or a solution of 10% Igepal CO-630 in water.

Gel Permeation Chromatography (GPC)

Ethylene interpolymer product molecular weights, $M_n$, $M_w$ and $M_z$, as well the as the polydispersity ($M_w/M_n$), were determined using ASTM D6474-12 (Dec. 15, 2012). Ethylene interpolymer product sample solutions (1 to 2 mg/mL) were prepared by heating the interpolymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the interpolymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect GPC columns from oxidative degradation. The sample injection volume was 200 μL. The GPC raw data were processed with the Cirrus GPC software. The GPC columns were calibrated with narrow distribution polystyrene standards. The polystyrene molecular weights were converted to polyethylene molecular weights using the Mark-Houwink equation, as described in ASTM D6474-12 (Dec. 15, 2012).

GPC-FTIR

Ethylene interpolymer product (polymer) solutions (2 to 4 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a Waters GPC 150C chromatography unit equipped with four Shodex columns (HT803, HT804, HT805 and HT806) using TCB as the mobile phase with a flow rate of 1.0 mL/minute, with a FTIR spectrometer and a heated FTIR flow through cell coupled with the chromatography unit through a heated transfer line as the detection system. BHT was added to the mobile phase at a concentration of 250 ppm to protect SEC columns from oxidative degradation. The sample injection volume was 300 μL. The raw FTIR spectra were processed with OPUS FTIR software and the polymer concentration and methyl content were calculated in real time with the Chemometric Software (PLS technique) associated with the OPUS. Then the polymer concentration and methyl content were acquired and baseline-corrected with the Cirrus GPC software. The SEC columns were calibrated with narrow distribution polystyrene standards. The polystyrene molecular weights were converted to polyethylene molecular weights using the Mark-Houwink equation, as described in the ASTM standard test method D6474. The comonomer content was calculated based on the polymer concentration and methyl content predicted by the PLS technique as described in Paul J. DesLauriers, Polymer 43, pages 159-170 (2002); herein incorporated by reference.

The GPC-FTIR method measures total methyl content, which includes the methyl groups located at the ends of each macromolecular chain, i.e. methyl end groups. Thus, the raw GPC-FTIR data must be corrected by subtracting the contribution from methyl end groups. To be more clear, the raw GPC-FTIR data overestimates the amount of short chain branching (SCB) and this overestimation increases as molecular weight (M) decreases. In this disclosure, raw GPC-FTIR data was corrected using the 2-methyl correction. At a given molecular weight (M), the number of methyl end groups ($N_E$) was calculated using the following equation; $N_E=28000/M$, and $N_E$ (M dependent) was subtracted from the raw GPC-FTIR data to produce the SCB/1000C (2-Methyl Corrected) GPC-FTIR data.

Unsaturation Content

The quantity of unsaturated groups, i.e. double bonds, in an ethylene interpolymer product was determined according to ASTM D3124-98 (vinylidene unsaturation, published March 2011) and ASTM D6248-98 (vinyl and trans unsaturation, published July 2012). An ethylene interpolymer sample was: a) first subjected to a carbon disulfide extraction to remove additives that may interfere with the analysis; b) the sample (pellet, film or granular form) was pressed into a plaque of uniform thickness (0.5 mm), and; c) the plaque was analyzed by FTIR. In this disclosure the following data was reported: the internal unsaturations/100C, the side chain unsaturations/100C and the terminal vinyl unsaturations/100C.

Comonomer Content: FTIR Spectroscopy

The quantity of comonomer in an ethylene interpolymer product was determine by FTIR and reported as the Branching Fraction/1000C, or BrF/1000C, i.e. the number of methyl branches per 1000 carbon atoms. This test was completed according to ASTM D6645-01 (2001), employing a compression molded polymer plaque and a Thermo-Nicolet 750 Magna-IR Spectrophotometer. The polymer plaque was prepared using a compression molding device (Wabash-Genesis Series press) according to ASTM D4703-16 (April 2016).

Composition Distribution Branching Index (CDBI)

The "Composition Distribution Branching Index" or "CDBI" of the disclosed Examples and Comparative Examples were determined using a crystal-TREF unit commercially available form Polymer ChAR (Valencia, Spain). The acronym "TREF" refers to Temperature Rising Elution Fractionation. A sample of ethylene interpolymer product (80 to 100 mg) was placed in the reactor of the Polymer ChAR crystal-TREF unit, the reactor was filled with 35 ml of 1,2,4-trichlorobenzene (TCB), heated to 150° C. and held at this temperature for 2 hours to dissolve the sample. An aliquot of the TCB solution (1.5 mL) was then loaded into the Polymer ChAR TREF column filled with stainless steel beads and the column was equilibrated for 45 minutes at 110° C. The ethylene interpolymer product was then crystallized from the TCB solution, in the TREF column, by slowly cooling the column from 110° C. to 30° C. using a cooling rate of 0.09° C. per minute. The TREF column was then equilibrated at 30° C. for 30 minutes. The crystallized ethylene interpolymer product was then eluted from the TREF column by passing pure TCB solvent through the column at a flow rate of 0.75 mL/minute as the temperature of the column was slowly increased from 30° C. to 120° C. using a heating rate of 0.25° C. per minute. Using Polymer ChAR software a TREF distribution curve was generated as the ethylene interpolymer product was eluted from the TREF column, i.e. a TREF distribution curve is a plot of the quantity (or intensity) of ethylene interpolymer eluting from the column as a function of TREF elution temperature. A $CDBI_{50}$ was calculated from the TREF distribution curve for each ethylene interpolymer product analyzed. The "$CDBI_{50}$" is defined as the percent of ethylene interpolymer whose composition is within 50% of the median comonomer composition (25% on each side of the median comonomer composition); it is calculated from the TREF composition distribution curve and the normalized cumulative integral of the TREF composition distribution curve. Those skilled in the art will understand that a calibration curve is required to convert a TREF elution temperature to comonomer content, i.e. the amount of comonomer in the ethylene interpolymer fraction that elutes at a specific temperature. The generation of such calibration curves are described in the prior art, e.g. Wild, et al., J. Polym. Sci., Part B, Polym. Phys., Vol. 20 (3), pages 441-455: hereby fully incorporated by reference.

Neutron Activation Analysis (NAA)

Neutron Activation Analysis, hereinafter NAA, was used to determine catalyst residues in ethylene interpolymers and was performed as follows. A radiation vial (composed of ultrapure polyethylene, 7 mL internal volume) was filled with an ethylene interpolymer product sample and the sample weight was recorded. Using a pneumatic transfer system the sample was placed inside a SLOWPOKE™ nuclear reactor (Atomic Energy of Canada Limited, Ottawa, Ontario, Canada) and irradiated for 30 to 600 seconds for short half-life elements (e.g., Ti, V, Al, Mg, and Cl) or 3 to 5 hours for long half-life elements (e.g. Zr, Hf, Cr, Fe and Ni). The average thermal neutron flux within the reactor was $5 \times 10^{11}/cm^2/s$. After irradiation, samples were withdrawn from the reactor and aged, allowing the radioactivity to decay; short half-life elements were aged for 300 seconds or long half-life elements were aged for several days. After aging, the gamma-ray spectrum of the sample was recorded using a germanium semiconductor gamma-ray detector (Ortec model GEM55185, Advanced Measurement Technology Inc., Oak Ridge, Tenn., USA) and a multichannel analyzer (Ortec model DSPEC Pro). The amount of each element in the sample was calculated from the gamma-ray spectrum and recorded in parts per million relative to the total weight of the ethylene interpolymer sample. The N.A.A. system was calibrated with Specpure standards (1000 ppm solutions of the desired element (greater than 99% pure)). One mL of solutions (elements of interest) were pipetted onto a 15 mm×800 mm rectangular paper filter and air dried. The filter paper was then placed in a 1.4 mL polyethylene irradiation vial and analyzed by the N.A.A. system. Standards are used to determine the sensitivity of the N.A.A. procedure (in counts/μg).

Dilution Index ($Y_d$) Measurements

A series of small amplitude frequency sweep tests were run on each sample using an Anton Paar MCR501 Rotational Rheometer equipped with the "TruGap™ Parallel Plate measuring system". A gap of 1.5 mm and a strain amplitude of 10% were used throughout the tests. The frequency sweeps were from 0.05 to 100 rad/s at the intervals of seven points per decade. The test temperatures were 170°, 190°, 210° and 230° C. Master curves at 190° C. were constructed for each sample using the Rheoplus/32 V3.40 software through the Standard TTS (time-temperature superposition) procedure, with both horizontal and vertical shift enabled. The $Y_d$ and $X_d$ data generated are summarized in Table 7.

Flexural Properties

Flexural properties, i.e. 1% secant flexural modulus was determined using ASTM D790-10 (published in April 2010).

ARM Impact Testing

The ARM impact test was performed in accordance with ASTM D5628, herein incorporated by reference, at a test temperature of −40° C. This test was adapted from the Association of Rotational Molders International, Low Temperature Impact Test, Version 4.0 dated July 2003; herein incorporated by reference. The purpose of this test was to determine the impact properties of the rotomolded parts. Arm Impact test specimens, 5 inch×5 inch (12.7 cm×12.7 cm) were cut from a side wall of the cubical rotomolded part. Test specimens were thermally equilibrated in a refrigerated testing laboratory maintained at −40° F.±3.5° F. (−40° C.±2° C.) for at least 24 hours prior to impact testing. The testing technique employed is commonly called the Bruceton Staircase Method or the Up-and-Down Method. The procedure establishes the height of a specific dart that will cause 50% of the specimens to fail, i.e. testing (dart falling on specimens) was carried out until there was a minimum of 10 passes and 10 fails. Each failure was characterized as a ductile or a brittle failure. Ductile failure was characterized by penetration of the dart though the specimen and the impact area was elongated and thinned leaving a hole with stringy fibers at the point of failure. Brittle failure was evident when the test specimen cracked, where the cracks radiated outwardly from point of failure and the sample showed very little to no elongation at the point of failure. The "ARM Ductility %" was calculated as follows: 100× [(number of ductile failures)/(total number of all failures)].

Samples were impact tested using a drop weight impact tester; impact darts available consisted of 10 lb (4.54 kg), 15 lb (6.80 kg), 20 lb (9.07 kg) or 30 lb (13.6 kg) darts. All impact darts had a rounded dart tip having a diameter of 1.0±0.005 inch (2.54 cm), the dart tip transitioned into a lower cylindrical shaft (1.0 inch diameter), the length of the lower cylindrical shaft (to dart tip) was 4.5 inch (11.4 cm). Impact dart included an upper cylindrical shaft having a diameter of 2.0 inch (5.08 cm), the length of the upper cylinder shaft varied depending on the desired weight of the dart, e.g. 10.5 inch (26.7 cm) or 16.5 inch (41.9 cm) for the 10 lb or 20 lb dart, respectively. Preferably a dart weight is selected such that the drop height is between 2.5 ft and 7.5 ft (0.8 m to 2.3 m). Test specimens were oriented in the impact tester such that the falling dart impacted the surface of the part that was in contact with the mold (when molded). If the sample did not fail at a given height and weight, either the height or weight was increased incrementally until part failure occurred. Once failure occurred, the height or weight is decreased by the same increment and the process is repeated. The "ARM Mean Failure Energy (ft·lbs)" was calculated by multiplying the drop height (ft) by the nominal dart weight (lbs). After impact, both the upper and lower surface of the specimen were inspected for failure. For the ethylene interpolymer products disclosed herein, a ductile failure was desired failure mode. In the ARM Impact test, a rotomolded part having an ARM Mean Failure Energy equal to or greater than or equal to 120 lb·ft in combination with an ARM Ductility equal to or greater than or equal to 50% was considered a good part, i.e. the part passed the ARM Impact test. To be clear, a wall structure having an ARM Mean Failure Energy ≥120 lb·ft and an ARM Ductility ≥50% passed the ARM Impact test. In contrast, a wall structure having an ARM Mean Failure Energy <120 lb·ft or an ARM Ductility <50% failed the ARM Impact test.

EXAMPLES

Polymerization

The following examples are presented for the purpose of illustrating selected embodiments of this disclosure; it being understood, that the examples presented do not limit the claims presented.

Embodiments of ethylene interpolymer products described herein were produced in a continuous solution polymerization pilot plant where a reactor 1 (R1) and a reactor 2 (R2) were arranged in a series configuration. Methylpentane was used as the process solvent (a commercial blend of methylpentane isomers). The volume of the first CSTR reactor (R1) was 3.2 gallons (12 L), the volume of the second CSTR reactor (R2) was 5.8 gallons (22 L) and the volume of the tubular reactor (R3) was 4.8 gallons (18 L). Examples of ethylene interpolymer products were produced using an R1 pressure from about 14 MPa to about 18 MPa; R2 was operated at a lower pressure to facilitate continuous flow from R1 to R2. R1 and R2 were operated in series mode, wherein the first exit stream from R1 flows directly into R2. Both CSTR's were agitated to give conditions in which the reactor contents were well mixed. The process was operated continuously by feeding fresh process solvent, ethylene, 1-octene and hydrogen to the reactors.

The single site catalyst components used were: component (i), cyclopentadienyl tri(tertiary butyl)phosphinimine titanium dichloride, (Cp[(t-Bu)$_3$PN]TiCl$_2$), hereinafter PIC-1; component (ii), methylaluminoxane (MAO-07); component (iii), trityl tetrakis(pentafluoro-phenyl)borate, and; component (iv), 2,6-di-tert-butyl-4-ethylphenol. The single site catalyst component solvents used were methylpentane for components (ii) and (iv) and xylene for components (i) and (iii). The quantity of PIC-1 added to R1, "R1 (i) (ppm)" is shown in Table 1A. To be clear, in Example 301 in Table 1A, the solution in R1 contained 0.20 ppm of component (i), i.e. PIC-1. The mole ratios of the single site catalyst components employed to produce Example 301 were: R1 (ii)/(i) mole ratio=100, i.e. [(MAO-07)/(PIC-1)]; R1 (iv)/(ii) mole ratio=0.0, i.e. [(2,6-di-tert-butyl-4-ethylphenol)/(MAO-07)], and; R1 (iii)/(i) mole ratio=1.1, i.e. [(trityl tetrakis (pentafluoro-phenyl)borate)/(PIC-1)]. The single site catalyst formulation was injected into R1 using process solvent, the flow rate of this catalyst containing solvent was about 30 kg/hr.

The in-line Ziegler-Natta catalyst formulation was prepared from the following components: component (v), butyl ethyl magnesium; component (vi), tertiary butyl chloride; component (vii), titanium tetrachloride; component (viii), diethyl aluminum ethoxide, and; component (ix), triethyl aluminum. Methylpentane was used as the catalyst component solvent. The in-line Ziegler-Natta catalyst formulation was prepared using the following steps. In step one, a solution of triethylaluminum and dibutylmagnesium ((triethylaluminum)/(dibutylmagnesium) molar ratio of 20) was combined with a solution of tertiary butyl chloride and allowed to react for about 30 seconds (HUT-1); in step two, a solution of titanium tetrachloride was added to the mixture formed in step one and allowed to react for about 14 seconds (HUT-2), and; in step three, the mixture formed in step two was allowed to reactor for an additional 3 seconds (HUT-3) prior to injection into R2. The in-line Ziegler-Natta procatalyst formulation was injected into R2 using process solvent, the flow rate of the catalyst containing solvent was about 49 kg/hr. The in-line Ziegler-Natta catalyst formulation was formed in R2 by injecting a solution of diethyl aluminum ethoxide into R2. The quantity of titanium tetrachloride "R2 (vii) (ppm)" added to reactor 2 (R2) is shown in Table 1A. To be clear in Example 301 the solution in R2 contained 4.3 ppm of TiCl$_4$. The mole ratios of the in-line Ziegler-Natta catalyst components are also shown in Table 1A, specifically: R2 (vi)/(v) mole ratio, i.e. [(tertiary butyl chloride)/ (butyl ethyl magnesium)]; R2 (viii)/(vii) mole ratio, i.e. [(diethyl aluminum ethoxide)/(titanium tetrachloride)], and; R2 (ix)/(vii) mole ratio, i.e. [(triethyl aluminum)/(titanium tetrachloride)]. To be clear, in Example 301, the following mole ratios were used to synthesize the in-line Ziegler-Natta catalyst: R2 (vi)/(v) mole ratio=2.07; R2 (viii)/(vii) mole ratio=1.35, and; R2 (ix)/(vii) mole ratio=0.35. In all of the Examples disclosed and Comparative Examples 78 and 79, 100% of the diethyl aluminum ethoxide was injected directly into R2.

In Examples 301 to 304 the ethylene interpolymer product was produced at a production rate of about 94 kg/h. Comparative Examples 78 and 79 were produced at a production rate of about 88 kg/hr.

Average residence time of the solvent in a reactor is primarily influenced by the amount of solvent flowing through each reactor and the total amount of solvent flowing through the solution process, the following are representative or typical values for the examples shown in Tables 1A-1C the average reactor residence times were about 61 seconds in R1, about 73 seconds in R2 and about 50 seconds in R3 (the volume of R3 was about 4.8 gallons (18 L)).

Polymerization in the continuous solution polymerization process was terminated by adding a catalyst deactivator to the third exit stream exiting the tubular reactor (R3). The catalyst deactivator used was octanoic acid (caprylic acid), commercially available from P&G Chemicals, Cincinnati, Ohio, U.S.A. The catalyst deactivator was added such that the moles of fatty acid added were 50% of the total molar amount of titanium and aluminum added to the polymerization process; to be clear, the moles of octanoic acid added=0.5×(moles titanium+moles aluminum); this mole ratio was consistently used in all Examples and Comparative Examples 76-79.

A two-stage devolatizing process was employed to recover the ethylene interpolymer product and comparative ethylene interpolymer product from the process solvent, i.e. two vapor/liquid separators were used and the second bottom stream (from the second V/L separator) was passed through a gear pump/pelletizer combination. DHT-4V (hydrotalcite), supplied by Kyowa Chemical Industry Co. LTD, Tokyo, Japan was used as a passivator, or acid scavenger, in the continuous solution process. A slurry of DHT-4V in process solvent was added prior to the first V/L separator. The molar amount of DHT-4V added was about 10-fold higher than the molar amount of chlorides added to the process; the chlorides added were titanium tetrachloride and tertiary butyl chloride.

Prior to pelletization the ethylene interpolymer product and comparative ethylene interpolymer product was stabilized by adding about 500 ppm of Irganox 1076 (a primary antioxidant) and about 500 ppm of Irgafos 168 (a secondary antioxidant), based on weight of the ethylene interpolymer product. Antioxidants were dissolved in process solvent and added between the first and second V/L separators.

Tables 1B-1C disclose additional solution process parameters, e.g. ethylene and 1-octene splits between the reactors, reactor temperatures and ethylene conversions, etc. recorded during the production of Examples 301-304 and Comparative Examples 78 and 79. In Tables 1A-1C the targeted ethylene interpolymer product and comparative ethylene interpolymer product were about 4.5 to about 6.0 melt index (I2) (ASTM D1239, 2.16 kg load, 190° C.) and about 0.935 to about 0.942 g/cc (ASTM D792). In Examples 301-304 the ethylene supplied to R1 ($ES^{R1}$, ethylene split) was 25 or 30% of the total ethylene while Comparative Examples 78-79 were produced at 30% $ES^{R1}$.

Ethylene Interpolymer Product Compounding

A UV (ultra violet) light protective additive was compounded into the ethylene interpolymer product and comparative ethylene interpolymer product using a twin screw compounding line. For example, ethylene interpolymer product (97.7 wt %) was tumble blended with an ethylene interpolymer masterbatch (2.3 wt %) containing Tinuvin 622 (a UV-light stabilizer available from BASF Corporation, Florham Park, N.J., U.S.A); this salt and pepper dry blend was melt mixed using a Coperion ZSK26MC intermeshing co-rotating twin screw extruder with a screw diameter of 26 mm and a length (L) to diameter (D) ratio of 32/1 (L/D). The extruder was operated at about 200° C. at a screw speed of about 200 rpm and pelletized at a rate of about 20 kg/hr. The compounded ethylene interpolymer product contain about 1500 ppm of UV-stabilizer. Prior to rotomolding, the compounded resin was passed through a grinder such that a powder of ethylene interpolymer product was produced having 35 US mesh size (mesh opening of 0.0197 inch (500 μm)).

Rotomolding

The powdered ethylene interpolymer product and comparative ethylene interpolymer product of this disclosure were converted into rotomolded parts employing a rotational molding machine; specifically, a Rotospeed RS3-160 available from Ferry Industries Inc. (Stow, Ohio, USA). The Rotospeed has two arms which rotate about a central axis within an enclosed oven. The arms are fitted with plates which rotate on an axis that is roughly perpendicular to the axis of rotation of the arm. Each arm is fitted with six cast aluminum molds that produce a hollow rotomolded part of cubical shape, i.e.: 12.5 inches (31.8 cm)×12.5 inches×12.5 inches. The arm rotation was set to about 8 revolutions per minute (rpm) and the plate rotation was set to about 2 rpm. Rotomolded parts having a nominal thickness of about 0.25 inches (0.64 cm) were produced employing a standard charge of about 3.7 kg of polyethylene resin in powder form; where the powder has a 35 US mesh size (mesh opening of 0.0197 inch (500 μm)). The temperature within the enclosed oven was maintained at a temperature of 560° F. (293° C.). The molds and their contents were heated in the oven for 18, 20, 22 or 24 minutes to ensure that full powder densification was achieved. The molds were subsequently cooled using air fans for about 30 minutes prior to removing the part from the mold. Specimens were collected from the molded parts for density, color and ARM Impact testing. Typically, the density of the rotomolded part and rotomolded test specimens was slightly higher than the density of the ethylene interpolymer product or comparative ethylene interpolymer product that was produced in the pilot plant.

TABLE 1A

Continous soluton polymerization process data for Examples 301-304 and Comparative Examples 78 and 79.

| Sample Code | Example 301 | Example 302 | Example 303 | Example 304 | Comp. Example 78 | Comp. Example 79 |
|---|---|---|---|---|---|---|
| R1 Catalyst | PIC-1 | PIC-1 | PIC-1 | PIC-1 | PIC-1 | PIC-1 |
| R2 Catalyst | ZN | ZN | ZN | ZN | ZN | ZN |
| R1 (i) (ppm) | 0.20 | 0.25 | 0.21 | 0.17 | 0.13 | 0.05 |
| R1 (ii)/(i) mole ratio | 100.0 | 100 | 100.0 | 100.0 | 100.0 | 100.2 |
| R1 (iv)/(ii) mole ratio | 0.00 | 0.00 | 0.00 | 0.00 | 0.00 | 0.00 |
| R1 (iii)/(i) mole ratio | 1.1 | 1.1 | 1.1 | 1.1 | 1.1 | 1.1 |
| R2 (vii) (ppm) | 4.3 | 4.7 | 4.7 | 4.2 | 4.4 | 4.4 |

TABLE 1A-continued

Continous soluton polymerization process data for Examples 301-304 and Comparative Examples 78 and 79.

| Sample Code | Example 301 | Example 302 | Example 303 | Example 304 | Comp. Example 78 | Comp. Example 79 |
|---|---|---|---|---|---|---|
| R2 (vi)/(v) mole ratio | 2.07 | 2.10 | 2.07 | 2.21 | 1.93 | 1.93 |
| R2 (viii)/(vii) mole ratio | 1.35 | 1.35 | 1.35 | 1.35 | 1.35 | 1.35 |
| R2 (ix)/(vii) mole ratio | 0.35 | 0.35 | 0.35 | 0.35 | 0.35 | 0.35 |
| Prod. Rate (kg/h) | 94.0 | 94.1 | 94.1 | 95.0 | 89.0 | 87.6 |

TABLE 1B

Additional solution process parameters for Examples 301-304 and Comparative Examples 78 and 79.

| Sample Code | Example 301 | Example 302 | Example 303 | Example 304 | Comp. Example 78 | Comp. Example 79 |
|---|---|---|---|---|---|---|
| R3 volume (L) | 18 | 18 | 18 | 18 | 18 | 18 |
| $ES^{R1}$ (%) | 30 | 30 | 25 | 25 | 30 | 30 |
| $ES^{R2}$ (%) | 70 | 70 | 75 | 75 | 70 | 70 |
| $ES^{R3}$ (%) | 0.0 | 0.0 | 0.0 | 0.0 | 0.0 | 0.0 |
| R1 ethylene concentration (wt %) | 8.80 | 8.70 | 8.60 | 8.60 | 8.78 | 9.39 |
| R2 ethylene concentration (wt %) | 16.2 | 16.0 | 16.2 | 16.9 | 16.8 | 16.4 |
| R3 ethylene concentration (wt %) | 16.2 | 16.0 | 16.2 | 16.9 | 16.8 | 16.4 |
| $((\text{octene})^T/(\text{ethylene})^T)$ (wt. fraction)$^a$ | 0.152 | 0.163 | 0.135 | 0.138 | 0.132 | 0.160 |
| $OS^{R1}$ (%) | 100 | 100 | 100 | 100 | 100 | 100 |
| $OS^{R2}$ (%) | 0 | 0 | 0 | 0 | 0 | 0 |
| OSR3 (%) | 0 | 0 | 0 | 0 | 0 | 0 |
| $H_2^{R1}$ (ppm) | 1.8 | 1.5 | 1.2 | 1.2 | 3.2 | 6.3 |
| $H_2^{R2}$ (ppm) | 23.0 | 22.3 | 24.3 | 29.3 | 13.5 | 5.0 |
| $H_2^{R3}$ (ppm) | 0.0 | 0.0 | 0.0 | 0.0 | 0.0 | 0.0 |

$^a$total amount of 1-octene (kg) added to the process divided by the total amount of ethylene (kg) added to the process.

TABLE 1C

Additional solution process parameters for Examples 301-304 and Comparative Examples 78 and 79.

| Sample Code | Example 301 | Example 302 | Example 303 | Example 304 | Comp. Example 78 | Comp. Example 79 |
|---|---|---|---|---|---|---|
| R1 total solution rate (kg/h) | 331.4 | 331.0 | 282.6 | 294.1 | 315.0 | 287.9 |
| R2 total solution rate (kg/h) | 268.6 | 269.0 | 316.6 | 305.9 | 235.0 | 262.1 |
| R3 solution rate (kg/h) | 0.0 | 0.0 | 0.0 | 0.0 | 0.0 | 0.0 |
| Overall total solution rate (kg/h) | 600.0 | 600.0 | 599.1 | 600.0 | 550.0 | 550.0 |
| R1 inlet temp (° C.) | 30.0 | 30.0 | 30.0 | 30.0 | 30.0 | 30.0 |
| R2 inlet temp (° C.) | 35.0 | 39.9 | 35.0 | 35.0 | 30.0 | 29.9 |
| R3 inlet temp (° C.) | 130 | 130 | 130 | 130 | 130 | 130 |
| R1 Mean temp (° C.) | 139.9 | 139.0 | 137.7 | 137.4 | 140.0 | 140.0 |
| R2 Mean temp (° C.) | 210.0 | 209.0 | 212.0 | 213.7 | 214.9 | 210.0 |
| R3 exit temp (actual) (° C.) | 220.4 | 219.2 | 223.9 | 223.3 | 223.6 | 220.1 |
| R3 exit temp (calc) (° C.) | 223.2 | 221.5 | 224.6 | 225.5 | 228.7 | 223.8 |
| $Q^{R1}$ (%) | 91.5 | 91.5 | 91.5 | 91.0 | 91.5 | 87.2 |
| $Q^{R2}$ (%) | 79.5 | 79.5 | 79.6 | 76.6 | 80.0 | 80.0 |
| $Q^{R2+R3}$ (%) | 91.0 | 92.3 | 91.9 | 91.1 | 91.0 | 92.1 |
| $Q^{R3}$ (%) | 56.2 | 62.5 | 60.2 | 62.0 | 55.2 | 60.3 |
| $Q^T$ (%) | 93.5 | 94.4 | 93.8 | 93.3 | 93.5 | 94.1 |

TABLE 2

Physical properties of Examples 301-304 and Comparative Examples 76-79.

| Sample Code | Ex. 301 | Ex. 302 | Ex. 303 | Ex. 304 | Comp. Ex. 78 | Comp. Ex. 79 | Comp. Ex. 76 | Comp. Ex. 77 |
|---|---|---|---|---|---|---|---|---|
| Density (g/cm³) | 0.9364 | 0.9361 | 0.9384 | 0.9381 | 0.9388 | 0.9378 | 0.9381 | 0.9396 |
| Melt Index $I_2$ (dg/min) | 5.04 | 4.76 | 4.70 | 4.56 | 5.13 | 4.63 | 4.57 | 4.82 |
| Melt Flow Ratio $I_{21}/I_2$ (dg/min) | 21.7 | 22.3 | 24.1 | 23.7 | 21.4 | 22.8 | 22.2 | 20.2 |
| Stress Exponent | 1.20 | 1.22 | 1.24 | 1.23 | 1.20 | 1.24 | 1.23 | 1.20 |
| BrF/1000 C $^a$ | 5.7 | 5.6 | 4.9 | 5.1 | 4.7 | 4.8 | 5.1 | 3.9 |
| Comonomer (mole %) | 1.1 | 1.1 | 1.0 | 1.0 | 0.90 | 1.0 | 1.0 | 0.8 |
| $M_n$ (g/mol) | 26833 | 27192 | 24170 | 24649 | 24585 | 26253 | 26355 | 27533 |
| $M_w$ (g/mol) | 67379 | 66698 | 74921 | 66330 | 72862 | 78839 | 76913 | 72689 |
| $M_z$ (g/mol) | 126996 | 127212 | 181607 | 131250 | 180399 | 232508 | 197451 | 160862 |
| $M_w/M_n$ | 2.51 | 2.45 | 3.10 | 2.69 | 2.96 | 3.00 | 2.92 | 2.64 |
| Internal Unsat/100 C | 0.003 | 0.003 | 0.003 | 0.002 | 0.002 | 0.002 | 0.005 | 0.002 |
| Side Chain Unsat/100 C | 0.000 | 0.001 | 0.000 | 0.003 | 0.002 | 0.001 | 0.002 | 0.002 |

TABLE 2-continued

Physical properties of Examples 301-304 and Comparative Examples 76-79.

| Sample Code | Ex. 301 | Ex. 302 | Ex. 303 | Ex. 304 | Comp. Ex. 78 | Comp. Ex. 79 | Comp. Ex. 76 | Comp. Ex. 77 |
|---|---|---|---|---|---|---|---|---|
| Terminal Vinyl Unsat/100 C | 0.050 | 0.048 | 0.054 | 0.058 | 0.053 | 0.052 | 0.053 | 0.053 |
| Ti (ppm) | 6.29 | 8.32 | 6.50 | n/a | | 7.02 [b] | | |

[a] BrF/1000 C, branch frequency as determined by FTIR
[b] Ti(ppm) database average.

TABLE 3

Temperature Rising Elution Fractionation (TREF), Comparison of Examples 301-304, relative to Comparative Examples 76-79.

| Sample Code | Ex. 301 | Ex. 302 | Ex. 303 | Ex. 304 | Comp. Ex. 76 | Comp. Ex. 77 | Comp. Ex. 78 | Comp. Ex. 79 |
|---|---|---|---|---|---|---|---|---|
| Density (g/cm$^3$) | 0.9364 | 0.9361 | 0.9384 | 0.9381 | 0.9381 | 0.9396 | 0.9388 | 0.9378 |
| Melt Index $I_2$ (dg/min) | 5.04 | 4.76 | 4.70 | 4.56 | 4.57 | 4.82 | 5.13 | 4.63 |
| $CDBI_{50}$ | 52.3 | 54.4 | 52.3 | 52.7 | 54.2 | 67.1 | 52.3 | 57.9 |
| T1 (° C.) | 95.6 | 95.7 | 95.6 | 95.3 | 95.4 | 95.3 | 96.1 | 95.7 |
| $T1^i$ | 0.0355 | 0.0336 | 0.0450 | 0.0429 | 0.0422 | 0.0462 | 0.0405 | 0.0378 |
| T2 (° C.) | 84.1 | 84.6 | 83.3 | 82.9 | 84.8 | 87.7 | 86.1 | 86.8 |
| $T2^i$ | 0.0257 | 0.0254 | 0.0209 | 0.0191 | 0.0193 | 0.0244 | 0.0229 | 0.0197 |
| (T1 − T2), (° C.) | 11.5 | 11.1 | 12.3 | 12.4 | 10.6 | 7.6 | 10.0 | 8.7 |
| $T1^i/T2^i$ | 1.38 | 1.32 | 2.15 | 2.24 | 2.19 | 1.89 | 1.77 | 1.91 |
| TV (° C.) | 87.0 | 88.0 | 86.2 | 86.4 | 88.4 | 91.2 | 89.3 | 90.3 |
| $TV^i$ | 0.0102 | 0.0114 | 0.0073 | 0.0072 | 0.0116 | 0.0168 | 0.0126 | 0.0162 |
| $(T1^i - T2^i)/(T1 - T2)$ (1/° C.) | 0.00085 | 0.00074 | 0.0020 | 0.0019 | 0.0022 | 0.0029 | 0.0018 | 0.0021 |
| $wtF^{\le 65}$ or $wtFc^{\le 65}$ [a] | 0.0051 | 0.0059 | 0.0038 | 0.034 | 0.022 | 0.012 | 0.0074 | 0.0051 |
| $wtF^{\le 85}$ or $wtFc^{\le 85}$ [a] | 0.353 | 0.321 | 0.324 | 0.342 | 0.285 | 0.146 | 0.221 | 0.221 |
| $wtF^{T2}$ or $wtFc^{T2}$ [a] | 0.431 | 0.459 | 0.352 | 0.372 | 0.435 | 0.506 | 0.355 | 0.341 |

[a] the subscript 'c' denotes the weight fraction of the comparative ethylene interpolymer product.

TABLE 4

Gel Permeation Chromatography (GPC) deconvolution of Example 301-304 relative to Comparative Examples 76-79.

| Sample Code | Ex. 301 | Ex. 302 | Ex. 303 | Ex. 304 | Comp. Ex. 76 | Comp. Ex. 77 | Comp. Ex. 78 | Comp. Ex. 79 |
|---|---|---|---|---|---|---|---|---|
| GPC deconvoluted first ethylene interpolymer | | | | | | | | |
| Weight % | 30.0 | 30.2 | 24.8 | 25.4 | 29.0 | 34.5 | 30.2 | 28.1 |
| $1^{st} M_n$ (g/mol) | 47243 | 50683 | 56786 | 57324 | 37804 | 36211 | 35470 | 25757 |
| $1^{st} M_w$ (g/mol) | 94288 | 101169 | 113375 | 114450 | 75411 | 72225 | 70742 | 51318 |
| $1^{st} M_z$ (g/mol) | 141432 | 151754 | 170062 | 171675 | 113116 | 108338 | 106113 | 76976 |
| $1^{st} M_w/M_n$ | 2.00 | 2.00 | 2.00 | 2.00 | 2.00 | 2.00 | 2.0 | 2.0 |
| BrF/1000 C [1] | 8.79 | 9.39 | 9.23 | 9.29 | 8.91 | 5.60 | 7.89 | 6.97 |
| Density Estimate [2] (g/cm$^3$) | 0.9226 | 0.9207 | 0.9197 | 0.9195 | 0.9247 | 0.9316 | 0.9272 | 0.9322 |
| GPC deconvoluted second ethylene interpolymer | | | | | | | | |
| Weight % | 61.4 | 61.0 | 66.2 | 65.3 | 62.9 | 57.4 | 61.7 | 63.3 |
| $2^{nd} M_n$ (g/mol) | 20388 | 20731 | 20007 | 19676 | 21415 | 21625 | 20980 | 22997 |
| $2^{nd} M_w$ (g/mol) | 56014 | 57500 | 54516 | 53191 | 66649 | 69684 | 62299 | 76862 |
| $2^{nd} M_z$ (g/mol) | 118487 | 122534 | 114133 | 110768 | 165462 | 185070 | 146448 | 208903 |
| $2^{nd} M_w/M_n$ | 2.75 | 2.77 | 2.72 | 2.70 | 3.11 | 3.22 | 3.01 | 3.39 |
| BrF/1000 C [1] | 2.06 | 2.15 | 1.88 | 1.71 | 2.33 | 1.51 | 1.79 | 2.24 |
| Density Estimate [2] (g/cm$^3$) | 0.9464 | 0.9460 | 0.9471 | 0.9478 | 0.9454 | 0.9479 | 0.9471 | 0.9451 |
| GPC deconvoluted third ethylene interpolymer | | | | | | | | |
| Weight % | 8.7 | 8.8 | 9.0 | 9.3 | 8.1 | 8.1 | 8.2 | 8.6 |
| $3^{rd} M_n$ (g/mol) | 17281 | 17605 | 16742 | 16589 | 18585 | 19209 | 18291 | 20698 |
| $3^{rd} M_w$ (g/mol) | 43636 | 44849 | 41665 | 40930 | 53287 | 57854 | 50267 | 64431 |

TABLE 4-continued

Gel Permeation Chromatography (GPC) deconvolution of Example 301-304 relative to Comparative Examples 76-79.

| Sample Code | Ex. 301 | Ex. 302 | Ex. 303 | Ex. 304 | Comp. Ex. 76 | Comp. Ex. 77 | Comp. Ex. 78 | Comp. Ex. 79 |
|---|---|---|---|---|---|---|---|---|
| $3^{rd}$ $M_z$ (g/mol) | 88470 | 91627 | 83576 | 80876 | 125106 | 145103 | 112777 | 164734 |
| $3^{rd}$ $M_w/M_n$ | 2.53 | 2.55 | 2.49 | 2.47 | 2.87 | 3.01 | 2.75 | 3.11 |
| BrF/1000 C[1] | 2.06 | 2.15 | 1.88 | 1.71 | 2.33 | 1.51 | 1.79 | 2.24 |
| Density Estimate [2] (g/cm³) | 0.9479 | 0.9475 | 0.9487 | 0.9493 | 0.9466 | 0.9490 | 0.9483 | 0.9460 |
| $4^{th}$ $M_w/M_n$ [4] | 2.73 | 2.76 | 2.71 | 2.69 | 3.09 | 3.20 | 2.95 | 3.32 |
| Overall: sum of deconvoluted first, second and third ethylene interpolymers ||||||||  |
| Weight % | 100.0 | 100.0 | 100.0 | 100.0 | 100.0 | 100.0 | 100.0 | 100.0 |
| $M_n$ (g/mol) | 24121 | 24765 | 23353 | 23138 | 24157 | 24825 | 23604 | 23479 |
| $M_w$ (g/mol) | 66411 | 69579 | 67977 | 67623 | 68108 | 69607 | 63863 | 68624 |
| $M_z$ (g/mol) | 126540 | 13,617 | 135613 | 135290 | 146073 | 154903 | 130814 | 177649 |
| $M_w/M_n$ | 2.75 | 2.81 | 2.91 | 2.92 | 2.82 | 2.80 | 2.71 | 2.92 |
| Δ Density [5] (g/cm³) | 0.0239 | 0.0253 | 0.0274 | 0.0283 | 0.0207 | 0.0163 | 0.0199 | 0.0129 |

[1] Estimated from FTIR (total Branch content) and GPC-FTIR
[2] Density = $0.979863 - 0.00594808*(BrF/1000\ C)^{0.65} - 0.000383133*[Log_{10}(M_n)]^3 - 0.00000577986*(M_w/M_n)^3 + 0.00557395*(M_z/M_w)^{0.25}$
[3] Assumed $3^{rd}$ ethylene interpolymer branch content = $2^{nd}$ ethylene interpolymer branch content
[4] $M_w/M_n$ of the binary blend containing the $2^{nd}$ and $3^{rd}$ ethylene interpolymers
[5] Δ Density = $2^{nd}$ Ethylene Interpolymer Density − $1^{st}$ Ethyene Interpolymer Density

TABLE 5

Compression molded plaque physical properties of Examples 301-304 and Comparative Examples 76-79.

| Sample Code | Density (g/cm³) | Melt Index I₂ (dg/min) | Flex Secant Modulus 1% (MPa) | ESCR Condition A100 (hr)[a] | ESCR Condition B100 (hr)[a] |
|---|---|---|---|---|---|
| Example 301 | 0.9364 | 5.04 | 761 | >1000 | >1000 |
| Example 302 | 0.9361 | 4.76 | 762 | >1000 | >1000 |
| Example 303 | 0.9384 | 4.70 | 814 | >1000 | >1000 |
| Example 304 | 0.9381 | 4.56 | 847 | >1000 | >1000 |
| Comparative Example 76 | 0.9381 | 4.57 | 850 | 167.00 | 847.00 |
| Comparative Example 77 | 0.9396 | 4.82 | 916 | 67.00 | 141.00 |
| Comparative Example 78 | 0.9388 | 5.13 | 838 | 161.00 | 245.00 |
| Comparative Example 79 | 0.9378 | 4.63 | 827 | 121.00 | 194.00 |

[a] Condition A100 and B100 were conducted using 100% Igepal CO-630

TABLE 6

Low temperature (−40° C.) ARM impact properties of rotomolded parts prepared from Examples 301, 302 and 303 (Example 304 was not rotomolded); relative to Comparative Examples 76-79. All samples contained a UV additive.

| Sample Code | Density (g/cm³)[a] | Oven Residence Time (min) | ARM Mean Failure Energy (ft · lb) | ARM Ductility (%) |
|---|---|---|---|---|
| Example 301 | 0.939 | 20 | 190 | 100 |
| Example 302 | 0.940 | 20 | 183 | 100 |
| Example 303 | 0.942 | 20 | 172 | 100 |
| Comparative Example 76 | 0.942 | 18 | 175 | 100 |
| Comparative Example 77 | 0.943 | 18 | 176 | 100 |
| Comparative Example 78 | 0.942 | 20 | 187 | 100 |
| Comparative Example 79 | 0.941 | 18 | 187 | 100 |

[a] density measured on a specimen taken from the rotomolded part

TABLE 7

Additional physical properties of Example 301-304 relative to Comparative Examples 76 and 77 and Comparative D and E.

| Sample Code | Example 301 | Example 302 | Example 303 | Example 304 | Comp. Example 76 | Comp. Example 77 | Comp. D | Comp. E |
|---|---|---|---|---|---|---|---|---|
| Density [g/cm³] | 0.9364 | 0.9361 | 0.9384 | 0.9381 | 0.9381 | 0.9396 | 0.9204 | 0.9161 |
| Melt Index I₂ [dg/min] | 5.04 | 4.76 | 4.70 | 4.56 | 4.57 | 4.82 | 0.82 | 1.00 |
| $\eta_0$ [kPa · s] | 1.713 | 1.826 | 2.013 | 1.987 | 2.005 | 1.825 | 15.43 | 13.93 |
| $G^*_c$ [kPa] Modulus at $\omega_c = 0.01\omega_x$ | 7.118 | 7.063 | 7.435 | 7.129 | 8.780 | 8.675 | 10.84 | 10.41 |
| $\delta_c$ [°] Phase Angle at $\omega_c = 0.01\omega_x$ | 80.7 | 80.5 | 78.7 | 79.7 | 78.5 | 79.5 | 70.4 | 70.5 |

TABLE 7-continued

Additional physical properties of Example 301-304 relative to Comparative Examples 76 and 77 and Comparative D and E.

| Sample Code | Example 301 | Example 302 | Example 303 | Example 304 | Comp. Example 76 | Comp. Example 77 | Comp. D | Comp. E |
|---|---|---|---|---|---|---|---|---|
| $Y_d$, Dilution Index, [°] | 5.19 | 4.95 | 3.43 | 4.19 | 4.19 | 5.09 | −2.73 | −2.87 |
| $X_d$, Dimensionless Modulus | −0.12 | −0.13 | −0.10 | −0.12 | −0.031 | −0.04 | 0.06 | 0.04 |
| Terminal Vinyl Unsat/100 C | 0.050 | 0.048 | 0.054 | 0.058 | 0.053 | 0.053 | n/a | 0.022 ± 0.003 |
| Ti (ppm) | 6.29 | 8.32 | 6.50 | n/a | 7.02 [a] | | n/a | 1.25 ± 0.07 |

[a] Ti(ppm) database average.

What is claimed is:

1. A rotomolded article comprising a wall structure; wherein said wall structure comprises at least one layer comprising an ethylene interpolymer product comprising:
   (i) a first ethylene interpolymer;
   (ii) a second ethylene interpolymer, and;
   (iii) optionally a third ethylene interpolymer;
   wherein said ethylene interpolymer product has a Dilution Index, $Y_d$, greater than 0;
   wherein a plaque molded from said ethylene interpolymer product has (a) and/or (b),
   (a) passes an ESCR test Condition A100 and a comparative plaque
      fails said ESCR test Condition A100, wherein said ESCR test Condition A100 is passed if a failure time ($F^A{}_{50}$) is ≥1000 hr or said ESCR test Condition A100 is failed if said failure time ($F^A{}_{50}$) is <1000 hr;
   (b) passes an ESCR test Condition B100 and said comparative
      plaque fails said ESCR test Condition B100, wherein said ESCR test Condition B100 is passed if a failure time ($F^B{}_{50}$) is ≥1000 hr or said ESCR test Condition B100 is failed if said failure time ($F^B{}_{50}$) is <1000 hr;
   wherein said comparative plaque comprises a comparative ethylene interpolymer product comprising a comparative first ethylene interpolymer, a comparative second ethylene interpolymer and optionally a comparative third ethylene interpolymer;
   wherein said ethylene interpolymer product has a TREF weight fraction eluting below 85° C., $wtF^{<85}$, that is at least 10% higher relative to a comparative TREF weight fraction eluting below 85° C., $wtF_c{}^{<85}$, of said comparative ethylene interpolymer product;
   wherein said first ethylene interpolymer has a weight average molecular weight, $1^{st}$ $M_w$, that is at least 20% higher relative a comparative weight average molecular weight of said comparative first ethylene interpolymer, $1^{st}$ $(M_w)_c$;
   wherein said failure times ($F^A{}_{50}$) and ($F^B{}_{50}$) are estimated graphically as described in Annex Al of ASTM D1693.

2. The rotomolded article of claim 1, wherein said ethylene interpolymer product has ≥0.03 terminal vinyl unsaturations per 100 carbon atoms.

3. The rotomolded article of claim 1, wherein said ethylene interpolymer product has ≥3 parts per million (ppm) of a total catalytic metal.

4. The rotomolded article of claim 1, wherein said ethylene interpolymer product has ≥0.03 terminal vinyl unsaturations per 100 carbons and ≥3 parts per million (ppm) of total catalytic metal.

5. The rotomolded article of claim 1, wherein said ethylene interpolymer product has a Dimensionless Modulus from about −0.16 to about −0.08.

6. The rotomolded article of claim 1 having a melt index from about 0.5 to about 15 dg/minute; wherein melt index is measured according to ASTM D1238 (2.16 kg load and 190° C.).

7. The rotomolded article of claim 1 having a density from about 0.930 to about 0.955 g/cc; wherein density is measured according to ASTM D792.

8. The rotomolded article of claim 1 having a $M_w/M_n$ from about 2 to about 6.

9. The rotomolded article of claim 1 having a $CDBI_{50}$ from about 50% to about 98%.

10. The rotomolded article of claim 1; wherein
   (i) said first ethylene interpolymer is from about 15 to about 60 weight percent of said ethylene interpolymer product and has a melt index from about 0.01 to about 200 dg/minute and a density from about 0.89 g/cm³ to about 0.975 g/cc, and;
   (ii) said second ethylene interpolymer is from about 30 to about 85 weight percent of said ethylene interpolymer product and has a melt index from about 0.3 to about 1000 dg/minute and a density from about 0.89 g/cm³ to about 0.975 g/cc, and;
   (iii) optionally said third ethylene interpolymer is from about 0 to about 30 weight percent of said ethylene interpolymer product and has a melt index from about 0.5 to about 2000 dg/minute and a density from about 0.89 to about 0.975 g/cc;
   wherein weight percent is the weight of said first, or said second or said optional third ethylene interpolymer divided by the weight of said ethylene interpolymer product;
   wherein melt index is measured according to ASTM D1238 (2.16 kg load and 190° C.) and density is measured according to ASTM D792.

11. The rotomolded article of claim 1; wherein said ethylene interpolymer product is synthesized using a solution polymerization process.

12. The rotomolded article of claim 1 further comprising from 0.1 to about 2.0 mole percent of one or more α-olefin.

13. The rotomolded article of claim 12; wherein said one or more α-olefin are $C_3$ to $C_{10}$ α-olefins.

14. The rotomolded article of claim 12; wherein said one or more α-olefin is 1-hexene, 1-octene or a mixture of 1-hexene and 1-octene.

15. The rotomolded article of claim 1; wherein said first ethylene interpolymer is synthesized using a single-site catalyst formulation.

16. The rotomolded article of claim 1; wherein said second ethylene interpolymer is synthesized using a first heterogeneous catalyst formulation.

17. The rotomolded article of claim 1; wherein said third ethylene interpolymer is synthesized using a first heterogeneous catalyst formulation or a second heterogeneous catalyst formulation.

18. The rotomolded article of claim 1 wherein said second ethylene interpolymer is synthesized using a first in-line Ziegler Natta catalyst formulation or a first batch Ziegler-Natta catalyst formulation; optionally, said third ethylene interpolymer is synthesized using said first in-line Ziegler Natta catalyst formulation or said first batch Ziegler-Natta catalyst formulation.

19. The rotomolded article of claim 1 wherein said third ethylene interpolymer is synthesized using a second in-line Ziegler Natta catalyst formulation or a second batch Ziegler-Natta catalyst formulation.

20. The rotomolded article of claim 1, having ≤1 part per million (ppm) of a metal A; wherein said metal A originates from a single site catalyst formulation used to synthesize said first ethylene interpolymer.

21. The rotomolded article of claim 20; wherein said metal A is titanium, zirconium or hafnium.

22. The rotomolded article of claim 1 having a metal B and optionally a metal C and the total amount of said metal B plus said metal C is from about 3 to about 11 parts per million; wherein said metal B originates from a first heterogeneous catalyst formulation used to synthesize said second ethylene interpolymer and optionally said metal C originates from a second heterogeneous catalyst formulation used to synthesize said third ethylene interpolymer; optionally said metal B and said metal C are the same metal.

23. The rotomolded article of claim 22; wherein said metal B and said metal C, are independently selected from titanium, zirconium, hafnium, vanadium, niobium, tantalum, chromium, molybdenum, tungsten, manganese, technetium, rhenium, iron, ruthenium or osmium.

24. The rotomolded article of claim 1 wherein said first ethylene interpolymer has a first $M_w/M_n$, said second ethylene interpolymer has a second $M_w/M_n$ and said optional third ethylene interpolymer has a third $M_w/M_n$; wherein said first $M_w/M_n$ is lower than said second $M_w/M_n$ and said optional third $M_w/M_n$.

25. The rotomolded article of claim 24; wherein the blending of said second ethylene interpolymer and said third ethylene interpolymer forms a heterogeneous ethylene interpolymer blend having a fourth $M_w/M_n$; wherein said fourth $M_w/M_n$ is not larger than said second $M_w/M_n$.

26. The rotomolded article of claim 24 wherein said second $M_w/M_n$ and said optional third $M_w/M_n$ are ≤4.0.

27. The rotomolded article of claim 1; wherein said first ethylene interpolymer has a first $CDBI_{50}$ from about 70 to about 98%, said second ethylene interpolymer has a second $CDBI_{50}$ from about 45 to about 98% and said optional third ethylene interpolymer has a third $CDBI_{50}$ from about 35 to about 98%.

28. The rotomolded article of claim 27; wherein said first $CDBI_{50}$ is higher than said second $CDBI_{50}$; optionally said first $CDBI_5O$ is higher than said third $CDBI_{50}$.

* * * * *